(12) United States Patent
Vikramaratne et al.

(10) Patent No.: US 11,941,147 B2
(45) Date of Patent: Mar. 26, 2024

(54) DETECTION OF PERSONALLY IDENTIFIABLE INFORMATION

(71) Applicant: Box, Inc., Redwood City, CA (US)

(72) Inventors: Victor De Vansa Vikramaratne, Sunnyvale, CA (US); Kave Eshghi, Los Altos, CA (US)

(73) Assignee: Box, Inc., Redwood City, CA (US)

( * ) Notice: Subject to any disclaimer, the term of this patent is extended or adjusted under 35 U.S.C. 154(b) by 220 days.

(21) Appl. No.: 17/463,372

(22) Filed: Aug. 31, 2021

(65) Prior Publication Data

US 2023/0064482 A1    Mar. 2, 2023

(51) Int. Cl.
*G06F 21/62* (2013.01)

(52) U.S. Cl.
CPC .............................. *G06F 21/6245* (2013.01)

(58) Field of Classification Search
CPC ... G06F 21/62; G06F 21/6218; G06F 21/6245
See application file for complete search history.

(56) References Cited

U.S. PATENT DOCUMENTS

| | | | |
|---|---|---|---|
| 7,512,985 B1* | 3/2009 | Grabarnik | G06F 21/6263 707/999.009 |
| 11,755,848 B1* | 9/2023 | Dan | G06F 21/6245 |
| 2018/0314853 A1 | 11/2018 | Oliner et al. | |
| 2019/0108419 A1 | 4/2019 | Coven et al. | |
| 2021/0056099 A1* | 2/2021 | Goodsitt | G06F 16/35 |
| 2021/0081613 A1* | 3/2021 | Begun | G06F 16/248 |
| 2021/0110062 A1 | 4/2021 | Oliner et al. | |
| 2021/0133557 A1* | 5/2021 | Iyoob | G06F 40/205 |

OTHER PUBLICATIONS

Justus, D. et al., Predicting the Computational Cost of Deep Learning Models, IEEE, 2018 IEEE International Conference on Big Data, p. 3873-82 (Year: 2018).*

Wang, X., et al., "Hyperscan: A Fast Multi-pattern Regex Matcher for Modern CPUs," Usenix Association, dated Dec. 18, 2018, URL: https://www.usenix.org/conference/nsdi19/presentation/wang-xiang.

"Cloud Data Loss Prevention," date found via Internet Archive as Mar. 3, 2020, URL: https://cloud.google.com/dlp.

* cited by examiner

*Primary Examiner* — D'Arcy Winston Straub
(74) *Attorney, Agent, or Firm* — Vista IP Law Group, LLP

(57) ABSTRACT

Methods, systems, and computer program products for detection of personally identifiable information (PII). A first detector and a second detector are configured to interoperate. The first detector is different from the second detector and the second detector incurs a greater computational cost than the first detector when processing identical content. Content is presented to the first detector so as to implement a first type of PII detection that is based at least in part on regular expression analysis using regular expressions. The content is presented to the second detector. The second detector performs PII detection based on content analysis that is different from the first detector's regular expression analysis. The second detector causes generation of new regular expressions based on the content analysis and the first detector is updated with such new regular expressions. Performance of the first detector is continually improved as new regular expressions are generated.

23 Claims, 14 Drawing Sheets

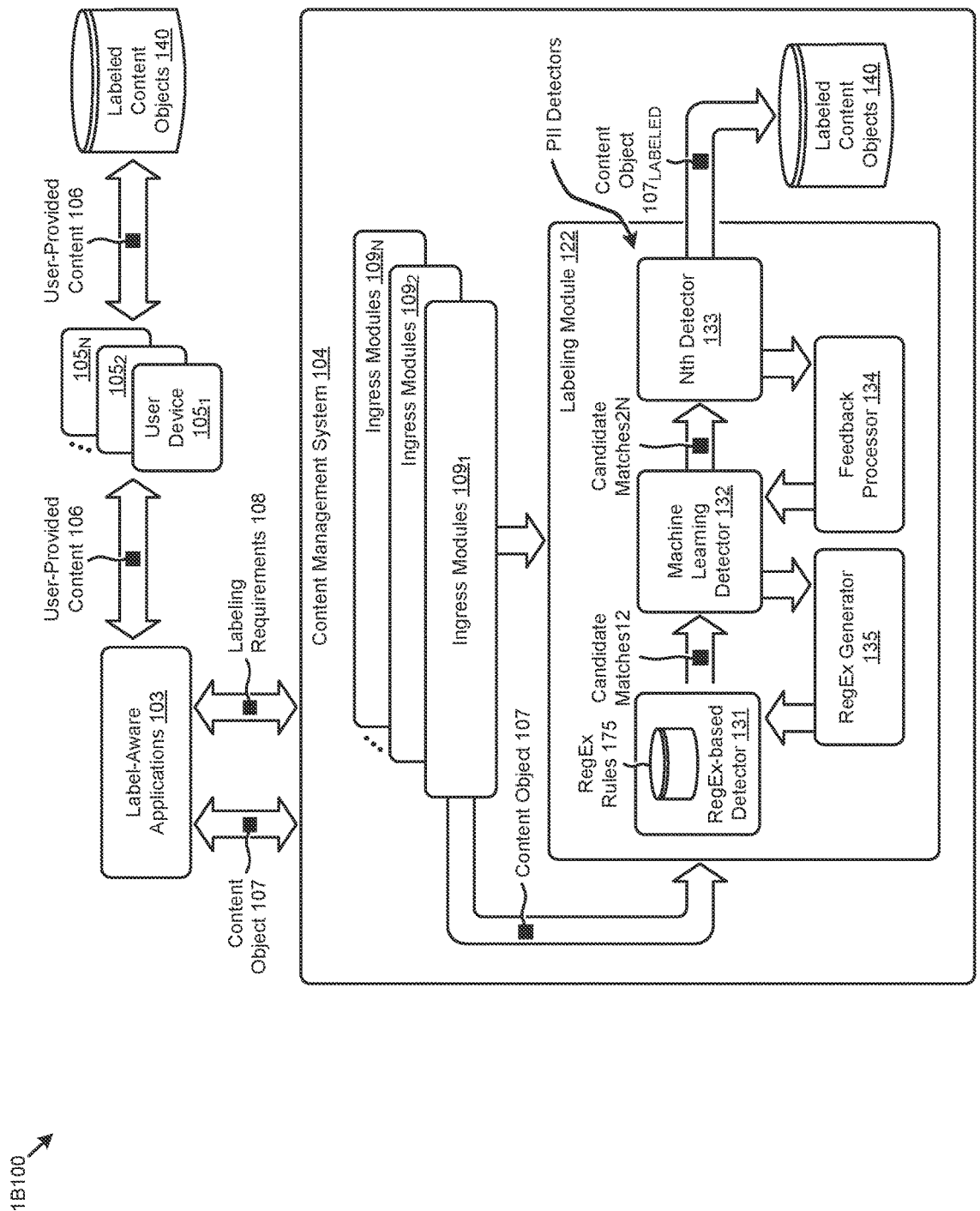
FIG. 1B1

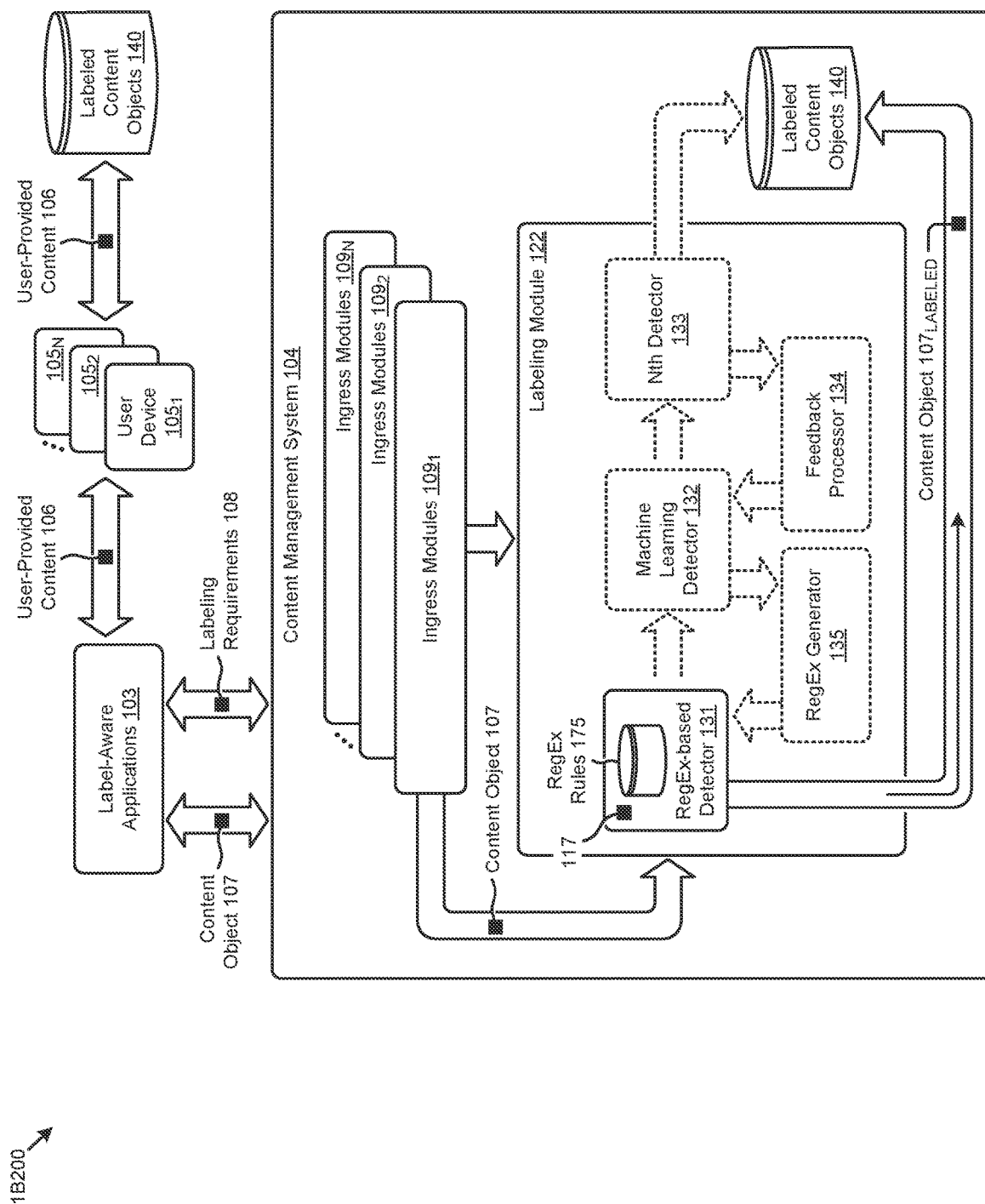
FIG. 1B2

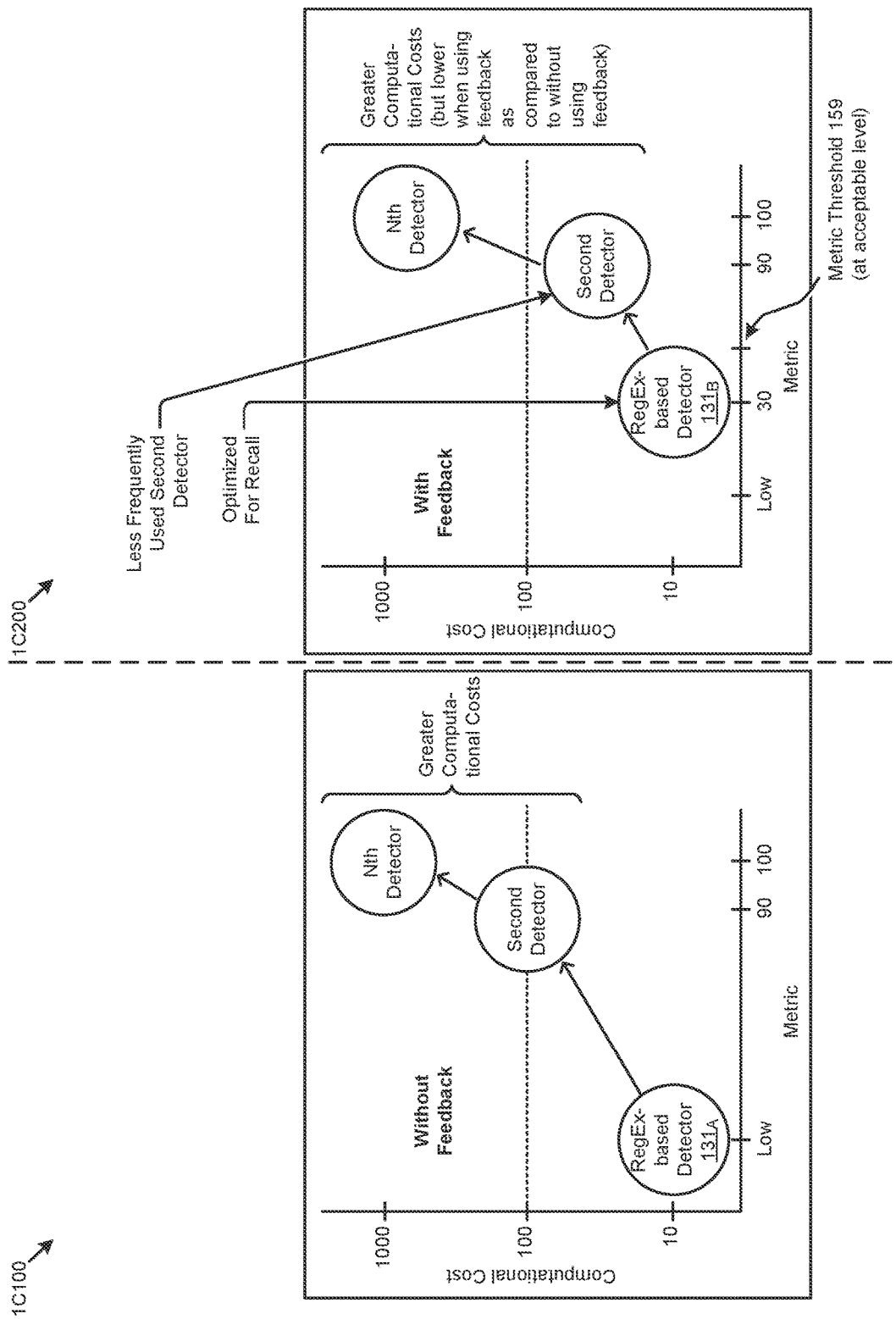
FIG. 1C1
FIG. 1C2

DETECTION OF PERSONALLY IDENTIFIABLE INFORMATION

TECHNICAL FIELD

This disclosure relates to PII detection, and more particularly to multi-stage detector systems for PII detection.

BACKGROUND

The continuous legislation and enactment of various governmental regulations that specify certain obligations pertaining to handling of personally identifiable information (PII) have raised obligations that apply to anyone or any entity that touches another's PII. Anyone or any entity that touches another's PII now must be aware of their obligations to protect or otherwise handle another's PII. In some cases PII is easy to identify. Such is the case where PII is entered into a form field that is intended to capture someone's PII (e.g., the form field corresponding to "Enter your Social Security Number Here:_____"). In some cases, PII is self-labeled by the owner of the PII, for example, "My phone number is (123) 456-7890". However, in some cases, PII is not unambiguously labeled. For example, consider the string "Is (123) 456-7890 your mobile number?". As compared to the former example, the latter example is not labeled as being a phone number of a person, yet it is indeed a phone number of a person.

Various computer-implemented techniques have been employed to be able to identify occurrences of PII in computer-readable materials. Some techniques are quite accurate, whereas other techniques are less accurate. In some cases, PII can be quickly identified using only a small amount of computing power however, in other cases, the PII can only be identified after expenditure of significantly more computing power.

Consider an enterprise scale situation where there are hundreds of thousands or millions of documents, and yet the enterprise still has obligations to handle each and every occurrence of the PII in accordance with the aforementioned governmental regulations. Unfortunately, in such an enterprise scale situation, it is extremely costly and in some cases impracticable to even identify each and every occurrence of the PII in the hundreds of thousands or millions of documents, much less take applicable actions that correspond to the obligations. Therefore, what is needed is a technique or techniques that address how to efficiently detect PII occurrences over a large corpus of documents.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for PII detection, which techniques advance the relevant technologies to address technological issues with legacy approaches. More specifically, the present disclosure describes techniques used in systems, methods, and in computer program products for a PII labeling system formed using a chain of successively more accurate PII detectors. Certain embodiments are directed to technological solutions for implementing a chain of detectors where results of downstream stages inform upstream stages.

The disclosed embodiments modify and improve over legacy approaches. In particular, the herein-disclosed techniques provide technical solutions that address the technical problems attendant to efficiently detecting PII occurrences in a large corpus of documents. Such technical solutions involve specific implementations (i.e., data organization, data communication paths, module-to-module interrelationships, etc.) that relate to the software arts for improving computer functionality. Various applications of the herein-disclosed improvements in computer functionality serve to reduce demand for computer memory, reduce demand for computer processing power, reduce network bandwidth usage, and reduce demand for intercomponent communication. For example, when performing computer operations that address the various technical problems underlying detecting PII occurrences over a large corpus of documents, both memory usage and CPU cycles demanded are significantly reduced as compared to the memory usage and CPU cycles that would be needed but for practice of the herein-disclosed. Strictly as one case, successive detector staging and the disclosed latter stage avoidance serves to reduce both memory usage and CPU cycles as compared to alternative approaches. As one specific example, during detection of PII occurrences over a large corpus of documents, improved detection capabilities can be exploited by moving the computational costs of PII detection from a higher computational cost region into a lower computational cost region. As such, the herein-disclosed improvements result in improved computer functionality at least in that the demand for computer processing power can be reduced without sacrificing detection accuracy.

The techniques for implementing a chain of detectors where results of downstream stages inform upstream stages overcome long standing yet heretofore unsolved technological problems associated with efficiently detecting PII occurrences in a large corpus of electronic documents.

Many of the herein-disclosed embodiments for implementing a chain of detectors where results of downstream stages inform upstream stages are technological solutions pertaining to technological problems that arise in the hardware and software arts that underlie content management systems. Aspects of the present disclosure achieve performance and other improvements in peripheral technical fields including, but not limited to, high performance computing and machine learning.

Some embodiments include a sequence of instructions that are stored on a non-transitory computer readable medium. Such a sequence of instructions, when stored in memory and executed by one or more processors, causes the one or more processors to perform a set of acts for implementing a chain of detectors where results of downstream stages inform upstream stages.

Some embodiments include the aforementioned sequence of instructions that are stored in a memory, which memory is interfaced to one or more processors such that the one or more processors can execute the sequence of instructions to cause the one or more processors to implement acts for implementing a chain of detectors where results of downstream stages inform upstream stages.

In various embodiments, any combinations of any of the above can be organized to perform any variation of acts for a PII labeling system formed using a chain of successively more accurate PII detectors, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1B1 exemplifies a content management system configuration that implements a PII labeling module formed using a chain of successively more accurate PII detectors, according to an embodiment.

FIG. 1B2 exemplifies a content management system configuration that implements fast, high-confidence PII detection based on feedback from a chain of successively more accurate PII detectors, according to an embodiment.

FIG. 1C1 and FIG. 1C2 are charts that show performance of a chain of successively more accurate PII detectors that are configured without feedback as compared with performance of a chain of successively more accurate PII detectors that are configured with feedback, according to an embodiment.

FIG. 2 exemplifies a system that implements new RegEx generation in a chain of successively more accurate PII detectors, according to an embodiment.

DETAILED DESCRIPTION

Figure 1A:
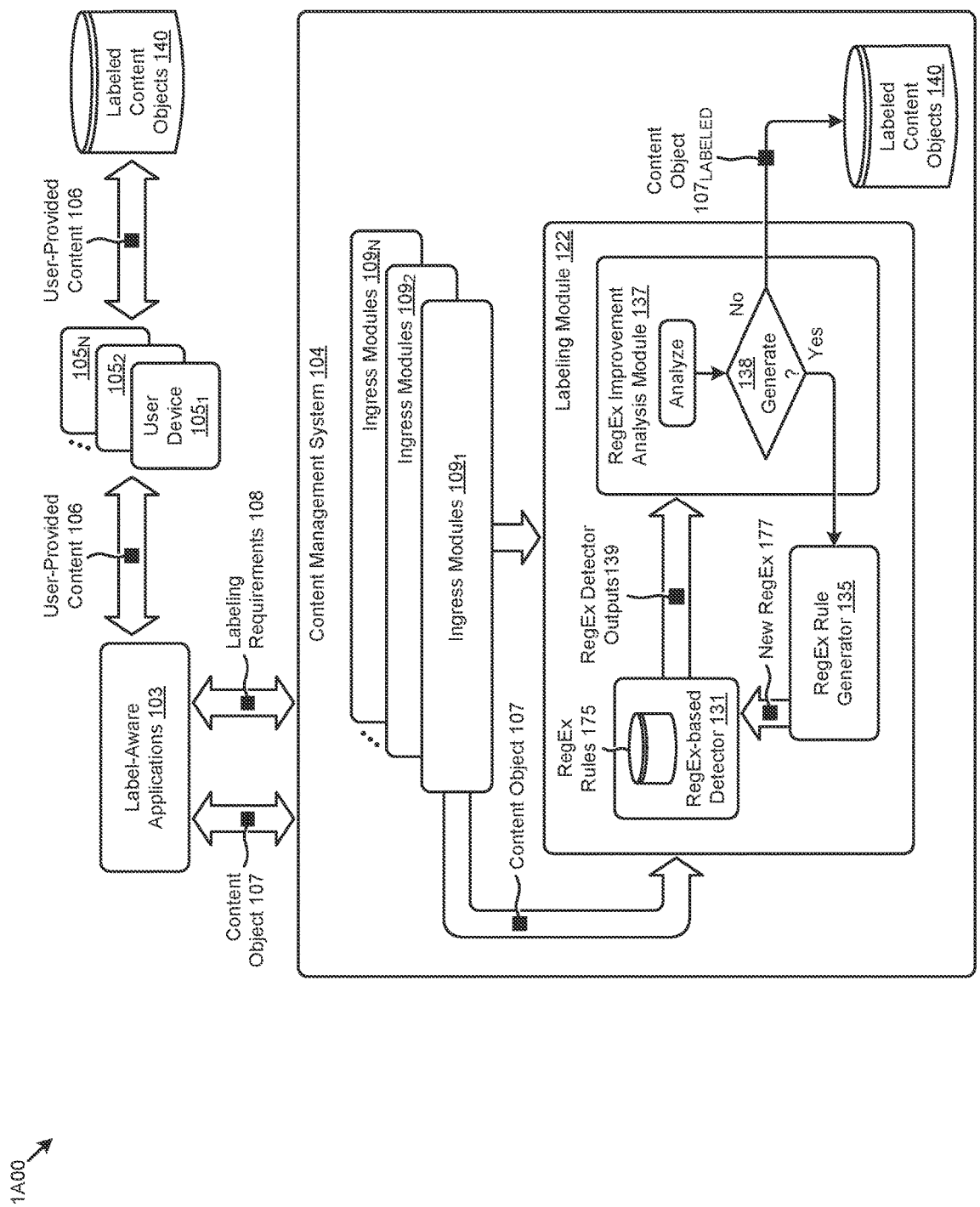
FIG. 1A exemplifies an environment in which embodiments of the present disclosure can be implemented.

Aspects of the present disclosure solve problems associated with using computer systems for efficiently detecting PII occurrences that might be found within a large corpus of documents. Some embodiments are directed to approaches for implementing a chain of detectors where results of downstream stages inform upstream stages. The accompanying figures and discussions herein present example environments, systems, methods, and computer program products for a PII labeling system formed using a chain of successively more accurate PII detectors.

OVERVIEW

Various computer-implemented detectors can be combined to achieve a particular level of confidence that suspected PII in a document is indeed PII. For example, a first detector might detect a particular string of interest and assign a high confidence value to that string immediately upon detection of that particular string. To illustrate, consider the string: "My phone number is: (123) 456-7890". A string-based detector (e.g., a regular expression-based detector) might assign a high confidence value to that string (e.g., a high confidence value that the string contains a phone number), at least because the string "My phone number is" has sufficiently strong semantics embedded in the string itself (e.g., the semantics of "My phone number is:") so as to serve as a label (e.g., a phone number label) for the number that follows. Merely having the semantically-strong linguistic label is enough to know, to a quantitative degree of certainty that the number that follows is indeed a phone number. However, a candidate string, "Is (123) 456-7890 your mobile?" does not carry such strong semantics. Additional context information might be needed to determine that the number in the string "Is (123) 456-7890 your mobile?" is indeed a phone number. The additional context information might be garnered from portions of the document that appear before or after the candidate string. In this case, if the document under consideration were a transcription of a text exchange between two participants, then the candidate question "Is (123) 456-7890 your mobile?", when viewed as a response to a previous statement, "My phone number is: (123) 456-7890" leads to a determination of a high confidence value that "(123) 456-7890" is a phone number is PII, and as such, the PII and/or the containing document is to be handled in accordance with the aforementioned government regulations. In this example, both occurrences of the number "(123) 456-7890" would be deemed to be PII and thus, both occurrences would need to be addressed vis-à-vis the obligations of the government regulations.

Unfortunately, while the processing power needed to identify, "(123) 456-7890" as a PII in the string "My phone number is: (123) 456-7890" is modest, the processing power needed to process context, such as "Is (123) 456-7890 your mobile?" is considerably greater, so much so that it becomes impracticable to process large repositories of documents, that are sometimes numbered in the hundreds of thousands or millions.

Some mechanism to be able to determine whether or not a portion of a document should be more deeply processed (e.g., for context, to possibly identify additional PII) is needed.

Disclosed hereunder are embodiments involving chained detectors where each successive downstream detector delivers greater accuracy at the expense of additional expenditure of computing resources. Further, disclosed hereunder are embodiments involving chained detectors where each successive downstream detector determines whether or not any further accuracy is needed. Still further, and disclosed hereunder, are embodiments where results of downstream stages inform upstream stages in a manner that improves the accuracy of the upstream detector, thus at least potentially avoiding invocation of the downstream detectors.

Some embodiments chain multiple stages of detectors such that a first stage performs regular expression (RegEx) detection, whereas downstream detectors cause generation of improved regular expressions which are thereafter used by the upstream detectors in a manner that improves the accuracy of the upstream detector. As used herein, a regular expression is a sequence of characters that specifies a search pattern that is sought in given content. In some cases, a regular expression includes both literals (e.g., characters to be matched exactly in the sought after search pattern) as well as wildcards (e.g., an asterisk, a period, a numeral enclosed in square brackets, etc.) that can be used to match one or more characters in the content. As such, the actual portion of the content that is matched by applying a regular expression to some content can be much longer (e.g., as measured by the character count of a matched search string) than the regular expression that corresponds to the match that was found.

This mechanism for improving the accuracy of an upstream detector thus, at least potentially, avoids invocation of the downstream detectors. In some cases, the improved upstream detector can assign a high confidence level to some occurrences of PII and thereby label the PII occurrence without the need for invocation of the downstream detectors.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material, or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A exemplifies an environment in which embodiments of the present disclosure can be implemented. As an option, one or more variations of environment 1A00 or any aspect thereof may be implemented in the context of the architecture and functionality of the embodiments described herein.

The figure is being presented to illustrate how a chain of successively more accurate PII detectors can be deployed in the context of a content management system so as to detect and label PII. Specifically, the figure shows pathways from original provision of content objects through a labeling module of the content management so as to produce labeled content objects, which can at that time or at a later time, can be handled in accordance with any then-current governance requirements. As used herein, PII detectors are computer-implemented modules that are configured to calculate the likelihood that a particular portion of content (e.g., portion of a content object) does contain a character string that can be used to determine an entity (e.g., a person) that corresponds to that particular portion of content. For example, the character string "(123) 456-6789" might be a phone number that corresponds to a particular person. As another example, the character string "4567 2345 1234 7890" might be a credit card number that corresponds to a particular credit card that is issued to a particular person. The foregoing content (e.g., portion of a content object) can derive from any source.

In this specific embodiment, user devices (e.g., user device $105_1$, user device $105_2$, ... user device $105_N$) generate user-provided content 106, which user-provided content might be self-labeled (e.g., via a form that required input of PII) or which user-provided content might be in a form (e.g., binary code, an image) or format (e.g., ".out" or ".jpeg") that is deemed not to contain detectable PII. Alternatively, the user devices might generate user-provided content that is run through any one or more label-aware applications 103. Strictly as examples, such label-aware applications might include governance modules that tag a given content object (e.g., content object 107) with specific labeling requirements 108 which labeling requirements might depend on aspects of the label-aware applications. A content object, in combination with any applicable labeling requirements 108 might be forwarded to one or more ingress modules (e.g., ingress module $109_1$, ingress module $109_2$, ... ingress module $109_N$). Each ingress module can be configured differently based on the source of the user-provided content, and/or based on the nature of the labeling requirements, and/or based on the nature of the content object itself.

In embodiments that comport with the environment of FIG. 1A, the labeling requirements 108 might derive from a governance module that periodically scans government sites to identify updates to any legislation that would inform the nature of the aforementioned labeling requirements. Strictly as one example, the State of California might periodically post legislated changes to that state's "California Consumer Privacy Act" (CCPA). An agent can periodically scan the "ca.gov" web site to see if there are any new or changed obligations that attach to retainers of user data. Any new or changed labeling requirements can thereafter be passed into one or more of the ingress modules, which ingress modules in turn pass such labeling requirements to a labeling module 122 (as shown).

In embodiments that comport with the environment of FIG. 1A, the labeling module might be composed of a RegEx detector 131, a RegEx improvement analysis module 137, and a RegEx rule generator 135. In this configuration, content object 107 is received at the RegEx-based detector, upon which receipt the received content object is subjected to a scan to find out if any of the rules from within the repository of RegEx rules 175 are a "hit" for this document (i.e., the document does contain a particular character sequence that corresponds to a particular RegEx rule). If so, a set of RegEx detector outputs 139 are passed into the RegEx improvement analysis module 137. The RegEx improvement analysis module will in turn analyze the RegEx detector outputs, possibly in conjunction with additional information (e.g., the entirety of the content object 107) to determine if the content object is sufficiently labeled (e.g., labeled with an indication of PII and a confidence value). If so, the "No" branch of decision 138 is taken, a label is associated with the content object (e.g., content object $107_{LABELED}$) and the content object $107_{LABELED}$ is stored in a repository of labeled content objects 140.

As one example of the foregoing path, it might be that the content object that is considered in the RegEx-based detector contains a phone number (e.g., "(123) 456-7890", and that phone number matches the formatting as specified in a RegEx, namely "(/\([1-9]{3}\).[0-9]{3}[0-9]{4}/". In this case, the RegEx detector outputs 139 comprise, at least the location of the first character that matches the subject RegEx, and in this case, it might happen that the generate decision (e.g., decision 138 takes the "No" branch because the subject content object is deemed to be sufficiently labeled. In the alternative, it might be that the generate decision (e.g., decision 138 takes the "Yes" branch because, even though the subject content object is labeled, it is deemed that the RegEx rules 175 can be augmented with an additional RegEx. In turn, if the additional RegEx rule (e.g., new RegEx rule 177) hits when scanning the content object, then the confidence value for that hit (e.g., a hit on a string of digits) can be increased relative to the confidence value assigned before consideration of a new regular expression.

This embodiment shows a RegEx-based detector at a first stage in a chain of successively more accurate PII detectors. Further, this embodiment shows a RegEx improvement analysis module that is situated downstream of the first stage, which RegEx improvement analysis module informs a RegEx rule generator that provides a feedback signal to the first stage. This is merely one sample embodiment to implement a chain of successively more accurate PII detectors. Another possible embodiment is shown and described as pertains to the content management system configuration of FIG. 1B.

FIG. 1B1 exemplifies a first content management system configuration 1B100 that implements a PII labeling module formed using a chain of successively more accurate PII detectors. As an option, one or more variations of content management system configuration 1B100 or any aspect thereof may be implemented in the context of the architecture and functionality of the embodiments described herein and/or in any environment.

This figure is being presented to illustrate how any number of PII detectors can be arranged in a chain. More specifically, this figure is being presented to illustrate how an upstream PII detector (e.g., RegEx detector 131) can be arranged in a chain whereby a given upstream module is informed via feedback from a downstream module. In this configuration, the module that is downstream of the RegEx detector 131 is machine learning detector 132, and the module that is downstream of machine learning detector 132 is Nth detector 133. Feedback into RegEx detector 131 is informed by RegEx rule generator 135 and feedback into machine learning detector 132 is informed by feedback processor 134.

Any number of detectors can be arranged in such a chain, and each feedback mechanism may vary based on the combination of (1) the nature of analysis performed in a downstream module and (2) the nature of analysis performed in a corresponding upstream module. More specifically, the nature of analysis performed in an upstream module (e.g., RegEx detector 131) might result in a first set of candidate matches (e.g., candidate matches12), whereas the nature of analysis performed in a downstream module (e.g., machine learning detector 132) might result in a second set of candidate matches (e.g., candidate matches2N). The confidence that a particular content object contains PII and/or increases the confidence that a particular string within a content object is PII (or a particular type of PII) increases as the detectors of successive stages operate over the content object.

Although each successive stage increases the confidence level that particular content object contains PII and/or increases the confidence that a particular string within a content object is a particular type of PII, execution through each successive stage demands more and more processing power. As such, it can be beneficial to avoid invocation of a downstream detector when a particular level of confidence has been reached. In other words, if a confidence level of 99% had been determined in a first detector, then that level of confidence might be high enough (e.g., as compared to a threshold) so as to avoid further processing to detect PII. One example embodiment whereby a first stage can label a content object based on a particular degree of confidence is shown and described as pertains to FIG. 1B2.

Figure 2:
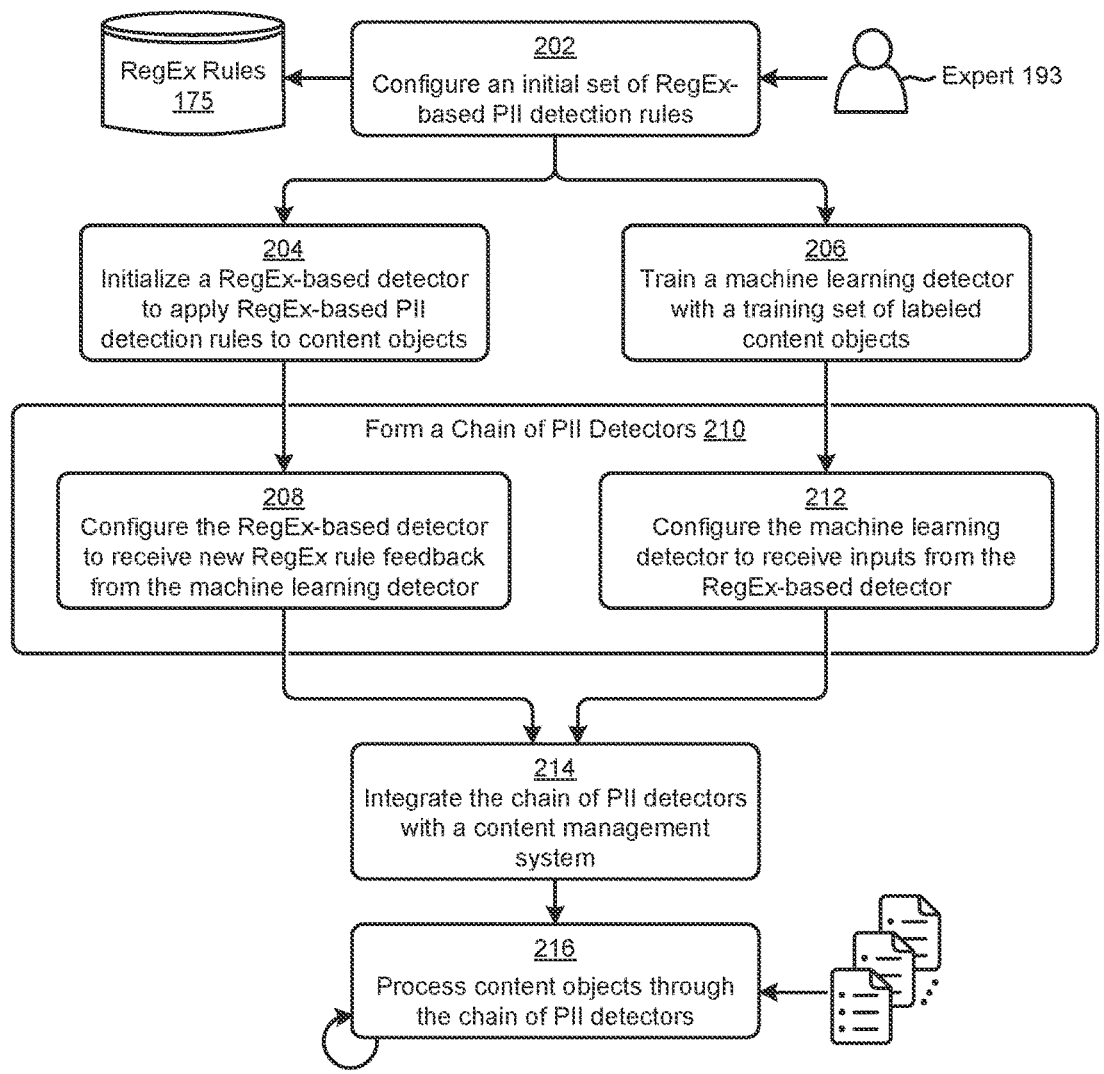

FIG. 1B2 exemplifies a second content management system configuration 1B200 that implements fast, high-confidence PII detection based on feedback from a chain of successively more accurate PII detectors. As an option, one or more variations of second content management system configuration 1B200 or any aspect thereof may be implemented in the context of the architecture and functionality of the embodiments described herein and/or in any environment.

This figure is being presented to exemplify a case where a particular content object or portion thereof need not be subjected to downstream detectors. More specifically, the figure is being presented to exemplify how a performance threshold 117 (e.g., a confidence threshold, a recall threshold, a precision threshold, etc.) can be used to bypass processing by downstream detectors. As shown, when a particular content object or portion thereof is deemed to meet or exceed a particular threshold, (e.g., upon being processed by a first detector such as the shown RegEx detector 131), then the particular content object or portion thereof can be labeled (e.g., content object $107_{LABELED}$) and stored (e.g., into a repository for labeled content objects 140), thereby bypassing processing by downstream detectors.

The savings of computing power that is garnered by optimizing a first detector (e.g., RegEx detector 131) for high-performance can be very significant. This is because pattern matching, such as happens in a RegEx detector demands much less processing power as compared to other techniques. Moreover, extremely high performance pattern matching can be implemented using hardware components such as content addressable memories (CAMs).

As heretofore mentioned, a RegEx-based detector at a first stage in a chain of successively more accurate PII detectors can be informed by a RegEx rule generator that provides a feedback signal to the first stage. In this case, a second or Nth downstream stage analyzes a content object or portion thereof to determine words or phrases appearing near PII. The determined words or phrases are deemed to be indicative of nearby PII and thus can be configured into a pattern matching strings. These determined words or phrases can thereafter be used to generate additional regular expressions, which in turn are used to implement high performance pattern matching in the first stage. As more and more of these regular expression pattern match strings (e.g., RegEx's) are generated (e.g., based on feedback from the downstream detectors), the ability for the first stage RegEx-based detector to label a content object or portion thereof is improved. Since pattern matching, such as happens in a RegEx detector demands much less processing power as compared to other techniques, performance of the labeling module as a whole is improved.

FIG. 1C1 and FIG. 1C2 are charts that show performance of a chain of successively more accurate PII detectors that are configured without feedback as compared with performance of a chain of successively more accurate PII detectors that are configured with feedback. As an option, one or more variations of chart 1C100 and chart 1C200 or any aspect thereof may be implemented in the context of the architecture and functionality of the embodiments described herein and/or in any environment.

The figure is being presented to illustrate how effective use of feedback such as new RegEx entries based on downstream processing can improve PII labeling performance in multiple dimensions: (1) the performance of the RegEx detector is continually improved (e.g., so as to be optimized for recall), and (2) the downstream detectors will be invoked less often since the RegEx detector, by itself, may reach a demanded threshold.

The foregoing improvements can be seen by comparing chart 1C200 to chart 1C100. As shown, RegEx detector 131$_B$ presents the same computation demands as RegEx detector 131$_A$ however, RegEx detector 131$_B$, after being improved by incorporating feedback from downstream detectors, yields improved metrics (e.g., improved recall, improved precision, improved confidence, etc.). As depicted in FIG. 1C2, these improved metrics are exploited in two ways: (1) for any given PII occurrence, the RegEx detector—by itself—may reach a demanded threshold (e.g., metric threshold 159), and (2) when the RegEx detector indeed does—by itself—reach a demanded threshold, then the downstream detectors need not be invoked. As can be seen, the second detector incurs a greater computational cost than the first detector when processing identical content. However, the improved metrics can be exploited by moving the computational costs from a higher computational cost region into a lower computational cost region—without sacrificing accuracy. In one circumstance, this can happen because when the shown RegEx detector 131E achieves a higher metric (e.g., over metric threshold 159), the shown second detector is less frequently used, thus resulting in a lower aggregate usage of computational resources, and yet without sacrificing accuracy.

Any of the herein-disclosed embodiments can be tuned to achieve certain metrics. For example, any one or more downstream detectors can be tuned to identify words or phrases that are deemed to be proximal to a candidate match (e.g., proximally preceding or proximally succeeding). In such a case, the addition of the words or phrases to a RegEx serves to improve a confidence value that a particular candidate match is indeed PII. Additionally or alternatively, a downstream detector can be configured to determine that a particular portion of a content object is PII, even if the RegEx detector did not deem that particular portion of the content object as PII. Additionally or alternatively, a RegEx detector can be configured to scan an entire content object, whereas one or more downstream detectors can be configured to consider only portions of the content object. In some cases, one or more downstream detectors can be individually configured so as to correspond to a type of content object. For example, a specialized downstream detector can be individually configured to process a spreadsheet or table. In such a case, the specialized downstream detector can be individually configured to consider headings of columns (e.g., a column heading such as "Phone Number") as an indicator that the items in that column are PII. As another example, a specialized downstream detector can be individually configured to provide an independent scan of a content object. In such a case, the specialized downstream detector may generate additional RegEx's to match against patterns that were not found by the RegEx detector. Any individual new pattern (e.g., codified as a regular expression) can be added to the repository of RegEx rules 175.

In some cases, the literals in a new regular expression might be longer than the literals in a previously codified regular expression. For example, a new regular expression might try to match the string "my product codes are" followed by a string of numerals, whereas the previously codified regular expression was shorter, specifically, the pattern "product code:" followed by a string of numerals. In this embodiment, the pattern of the new RegEx rule 177 is added to the RegEx rules 175, possibly in an order that precedes the previously codified pattern. In other embodiments, the pattern of a longer new RegEx rule 177 replaces the previously codified pattern.

The foregoing is but one example and many other techniques for adding or deleting or modifying a RegEx are possible. To illustrate one example of modifying the repository of RegEx rules 175, the determination as to whether to add a RegEx or delete a RegEx or modify/replace a previously held RegEx rule can be made on the basis of whether or not the previously held RegEx rule matches a proper subset of a match that would result from application of the new RegEx rule.

As yet another example, the determination to add or to delete or to modify a RegEx, can be made based on the constituency of RegEx's that become available on an ongoing basis based on outputs from a classifier training module.

Any of the foregoing detectors (e.g., RegEx detector 131 and/or machine learning detector 132) can be configured in any combination so as to achieve one or more of: (1) PII recall improvements, and/or (2) PII precision improvements, and/or (3) improved confidence that a particular candidate match is in fact PII, and/or (4) improved confidence that a particular context passage in fact contains PII.

Figure 1D:
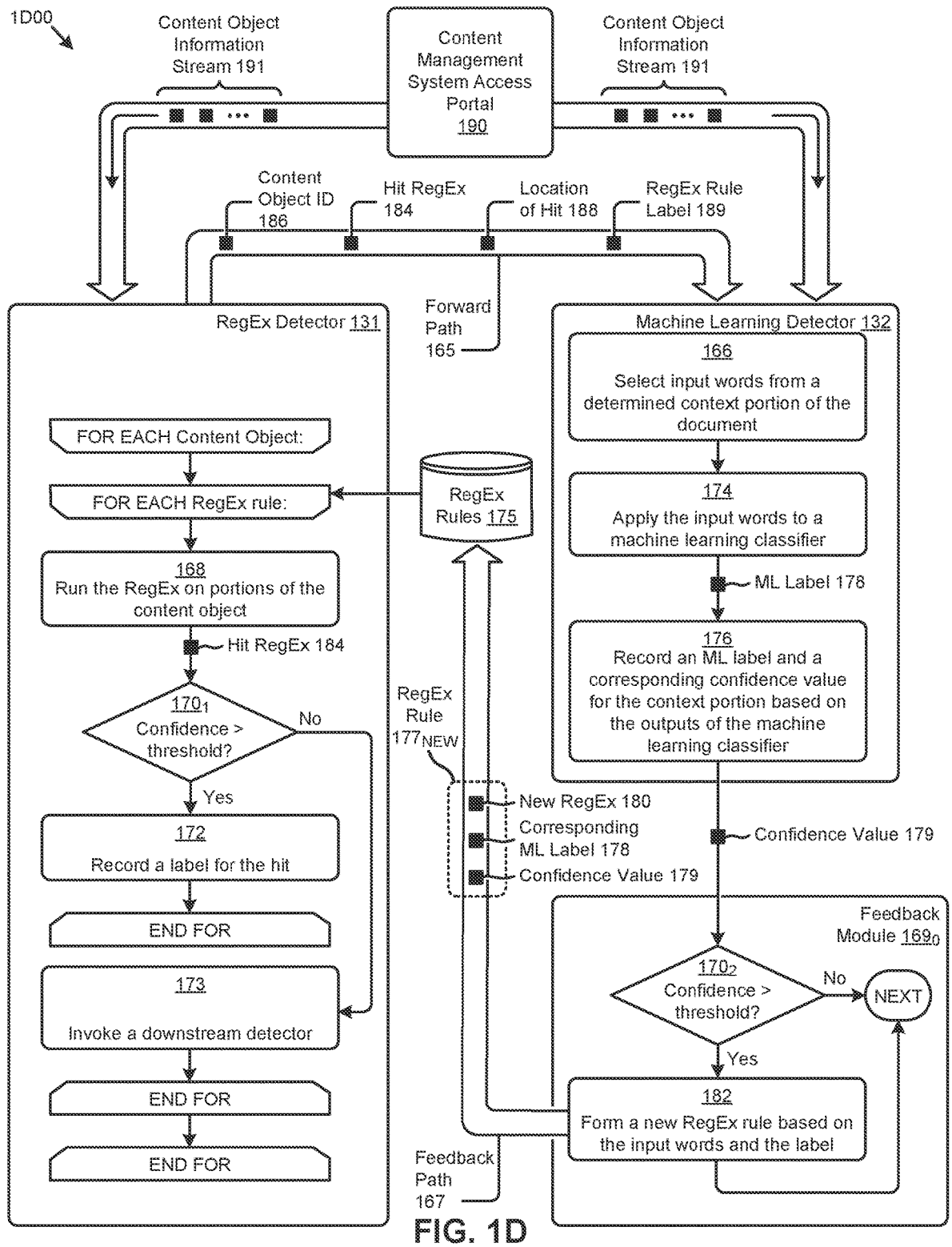
FIG. 1D shows an illustrative configuration of a two stage chain of successively more accurate PII detectors, according to an embodiment.

FIG. 1D shows an illustrative configuration of a two stage chain of successively more accurate PII detectors. As an option, one or more variations of two stage chain 1D00 or any aspect thereof may be implemented in the context of the architecture and functionality of the embodiments described herein and/or in any environment.

The figure is being presented to illustrate how a set of RegEx rules can be augmented based on findings of a machine learning detector, and thereafter used by an upstream RegEx detector. As shown, RegEx detector 131 communicates over a forward path 165 to a machine learning detector 132. Also as shown, machine learning detector 132 communicates over a feedback path 167 to augment the repository of RegEx rules 175, which are in turn used by RegEx detector 131.

Both the RegEx detector and the machine learning detector can access information from the content management system.

As used herein, a content management system is a computing system comprising executable code that facilitates performance of a set of coordinated functions, tasks, or activities on behalf of a plurality of collaborating users that operate over shared content objects. More specifically, a content management system facilitates collaboration activities such as creating a shared content object, establishing a set of users who can access the shared content object, concurrently (e.g., by multiple users at the same time) viewing a shared content object, concurrently editing a shared content object, modifying sharing configurations that pertain to a shared content object, and so on.

In one scenario, RegEx detector receives a stream of content objects via content object information stream 191. In another scenario, RegEx detector requests content objects from content management system access portal 190. In either scenario, for each content object in the stream, the RegEx rules are applied to the contents of the content object (step 168). In some embodiments, rather than using a FOR EACH loop that iterates through the RegEx rules, various graph decomposition techniques that translates regular expression matching operations into string and finite automata matches. In many cases, using the foregoing finite automata matching, duplicate matching operations can be avoided. Such an improved algorithm involving finite automata matching can be still further accelerated through use of computer-implemented SIMD instructions.

The RegEx detector is able to (1) emit a hit if a regular expression pattern is encountered during scanning of a particular content object, (2) determine if the confidence level of that hit (test $170_1$) is above a threshold, (3) associate a label with the location of the regular expression pattern match (e.g., regular expression "hit") if the confidence level is above a threshold (step 172), and (4) invoke a downstream detector (e.g., step 173) if the confidence level is not above the threshold.

In this latter case where, a downstream detector is invoked, the RegEx detector provides hit information to the downstream detector. In this specific embodiment, the information that the RegEx detector provides to the downstream detector includes (1) identification of the particular subject content object (e.g., via content object ID 186) that had been considered by the RegEx detector, (2) information about the specific RegEx rule that hit (e.g., hit RegEx 184), (3) information (e.g., location of hit 188) that defines the location (e.g., a paragraph number, an offset count from the beginning of the content object, an XML object that corresponds to a spreadsheet header name, etc.), and (4) the label (e.g., RegEx rule label 189) that corresponds to the RegEx pattern that hit.

In cases when the RegEx detector invokes machine learning detector 132, the machine learning detector will select input words from a portion of the content object that is proximal or otherwise related (e.g., via a link) to the location in the content object where the hit occurred (step 166). Those input words are provided as input signals to a machine learning classifier (step 174) and the classifier will emit a label (e.g., ML label). The ML label might be the same label as the given RegEx rule label, or it might be different. For example, the RegEx label might be "Phone Number", whereas the ML label might be "Mobile Phone Number". Step 176 serves to record an ML label for the context portion. A particular scope of the context (e.g., a start point and an end point) can be specified as corresponding to the ML label 178.

In situations when the machine learning detector emits a ML label, a feedback module $169_0$ is invoked. The feedback module tests whether the ML label confidence 179 is over a threshold (test $170_2$), and if so, the "Yes" branch of test $170_2$ is taken and the feedback module forms a new RegEx rule (step 182) based on the input words, the ML label, and the ML label confidence.

As shown in this embodiment, the new RegEx rule $177_{NEW}$ is composed of a new RegEx 180, a corresponding ML label 178, and a corresponding confidence value. The new RegEx 180 is then stored in 175

Figure 1E:
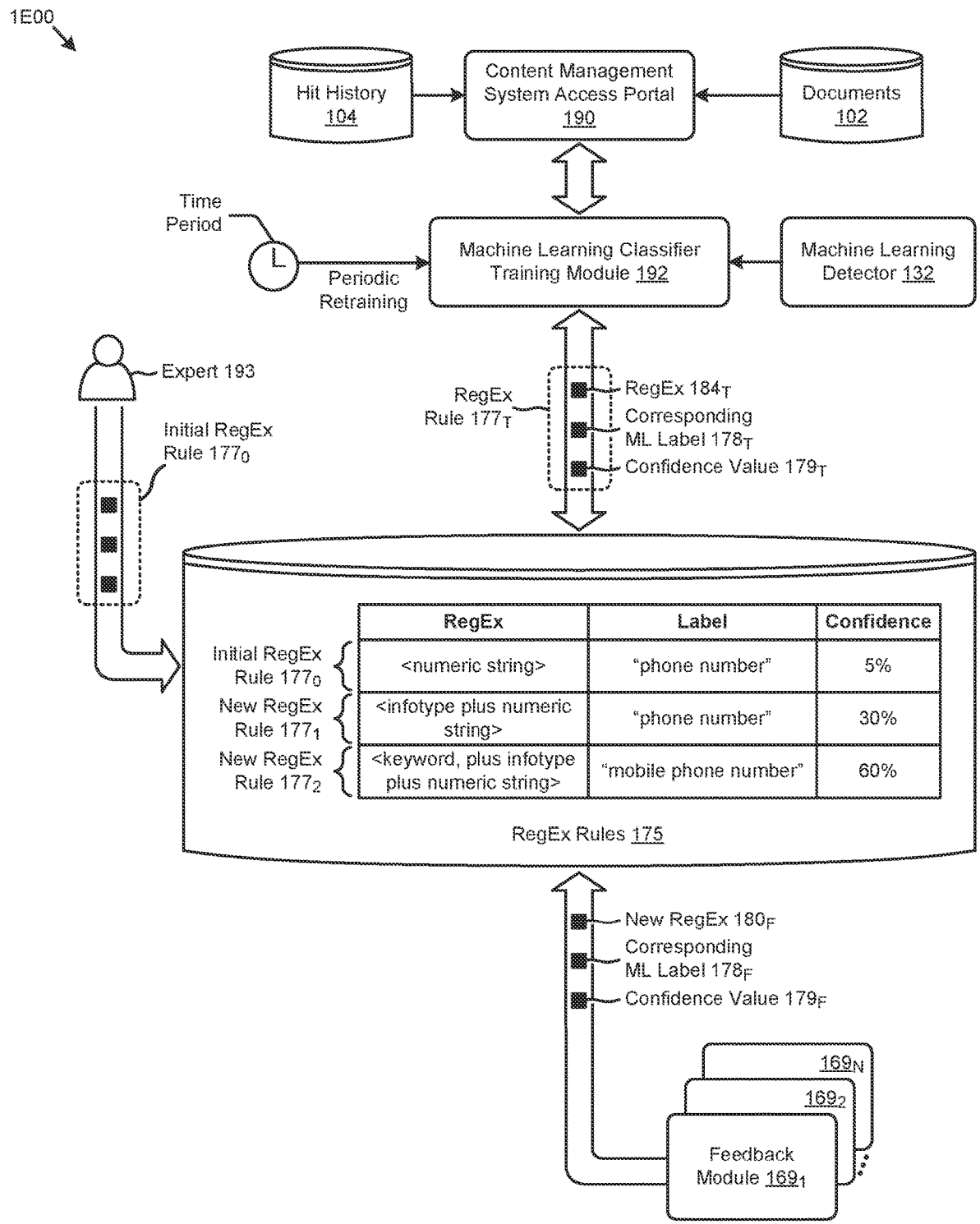
FIG. 1E shows an illustrative configuration of a RegEx rule population technique, according to an embodiment.

FIG. 1E shows an illustrative configuration of a RegEx rule population technique. As an option, one or more variations of RegEx rule population technique 1E00 or any aspect thereof may be implemented in the context of the architecture and functionality of the embodiments described herein and/or in any environment.

The figure is being presented to illustrate how a repository of RegEx rules can be (1) populated, initially, by an expert; (2) populated or modified on an ongoing basis based on outputs from a classifier training module; and (3) populated or modified on an ongoing basis based on feedback from a downstream detector and/or a corresponding feedback module.

As shown, an expert 193 codifies an initial set of RegEx rules. In the shown example, initial RegEx rule $177_0$ is stored in the repository of RegEx rules 175. In the shown example, the expert-generated rule includes (1) a regular expression that matches any numeric string, (2) a label to apply in the event of a hit of that regular expression, and (3) a confidence value that the hit is in fact a phone number. In the shown example, the confidence is given as 5%. This is because, even though a numeric string such as "18005551212" might indeed be a phone number, the numeric string such as "18005551212" might possibly be a product code or might possibly be merely a string of numerals that form a data item that is not considered to be PII.

Also shown in this example is a mechanism where a repository of RegEx rules can be periodically populated or modified based on outputs from a classifier training module. In the specific example shown, a machine learning classifier training module 192 is invoked periodically so as to cause the machine learning detector to undergo periodic retraining. The periodicity of the retraining can be based upon expiration of some pre-established time period, or invocation of the machine learning classifier training module can be based upon metrics (e.g., recall metrics, precision metrics, confidence metrics, etc.) as compared to respective threshold values (e.g., recall metric thresholds, precision metric thresholds, confidence metric thresholds, etc.). In some embodiments, invocation of a machine learning classifier training module can be based upon information that derives from content management system access portal 190. For example, an invocation of machine learning classifier training module 192 might be delayed until such time as the content management system has a new set of documents that have been saved into the content management system. Some of the new set of documents might be pre-labeled (e.g., by an expert or by a classifier) so as to support supervised or semi-supervised training.

In some embodiments, the machine learning classifier training module has access to the repository of RegEx rules, and as such, the machine learning classifier training module can select training signals (e.g., from context) that are conditionally independent from signals that are derived from the regular expressions. This explicit selection of different sets of signals serves to avoid overfitting of the machine learning model.

Further details regarding general approaches to exploiting occurrence of conditionally independent signals are described in commonly-owned U.S. application Ser. No. 17/163,243 titled "SELECTING CONDITIONALLY INDEPENDENT INPUT SIGNALS FOR UNSUPERVISED CLASSIFIER TRAINING" filed on Jan. 29, 2021, which is hereby incorporated by reference in its entirety.

As shown, the machine learning classifier training module can access (e.g., through content management system access portal 190) any documents 102 of the content management system. Moreover, the machine learning classifier training module can access (e.g., through content management system access portal 190) a hit history 104 such that prior classifications are available during training. The machine learning classifier training module 192 can output new or updated rules (e.g., trained RegEx rule $177_T$), each with a corresponding new or updated regular expression (e.g., RegEx $184_T$), a corresponding new or updated label (e.g., corresponding ML label $178_T$), and a corresponding new or updated confidence value (e.g., confidence value $179_T$). A new rule can be added to RegEx rules 175, and/or an updated rule or portion thereof can be applied to a previously existing occurrence of a rule in RegEx rules 175. In the shown example, new RegEx's (e.g., new RegEx rule $177_1$ and new RegEx rule $177_2$) might include a regular expression that matches to keywords and/or a natural language name for a particular information type (e.g., "phone number"). Continuing this example, new RegEx rule $177_1$ might include an information type (hereinafter "infotype") name and a new confidence value, which in this case, is showing as 30%, whereas new RegEx rule $177_2$ might be both a new keyword as well as an infotype name (e.g., "mobile phone number") and a new confidence value, which in this illustrative example, is showing as 60%.

Additionally, and as heretofore mentioned, any feedback module (e.g., feedback module $169_1$, feedback module $169_2$, . . . , feedback module $169_N$) using any feedback path, possibly involving a machine learning classifier and a regular expression generator, can provide a new or modified RegEx rule in the form of a new RegEx $180_F$, a corresponding label $178_F$, and a corresponding confidence value $179_F$. The new or modified RegEx rule can be applied to RegEx rules 175.

FIG. 2 exemplifies a system that implements new RegEx generation in a chain of successively more accurate PII detectors. As an option, one or more variations of system 200 or any aspect thereof may be implemented in the context of the architecture and functionality of the embodiments described herein and/or in any environment.

The figure is being presented to illustrate how a chain of successively more accurate PII detectors can be configured for integration into a content management system. More specifically, the figure is being presented to illustrate how two different detector types can be initialized and then organized into a chain of detectors that are used to identify PII that may be present in content objects.

As shown, an expert 193 configures an initial set of RegEx-based PII detection rules (step 202) into a repository of RegEx rules 175. A RegEx-based detector is initialized so as to configure the RegEx-based detector for continuous operation (e.g., PII detection) over content objects (step 204). Concurrently (as shown) or sequentially, a machine learning detector is trained using labeled content objects (step 206). Such labeled content object can be generated by the expert, and/or using any known technique for labeling PII. In some cases, PII in content objects used for training the machine learning detector is labeled using natural language processing (NLP) techniques. In some cases not only the existence of PII is detected but also the person to whom the PII belongs is detected. In some cases, labeled content objects generated by the expert can include special tokens (e.g., natural language tokens or gibberish tokens) that are defined (e.g., by the expert) to be guaranteed not to be PII and/or guaranteed not to be tokens that are indicative of PII or of content that is proximal to PII. In such as case, when training a machine learning detector, such content (e.g., that is guaranteed not to be PII and/or guaranteed not to be tokens that are indicative of PII) is included in the training set, and the model will be thusly trained so as to deem occurrences of such expert-defined content as noise. This serves to improve the performance of the model.

Further details regarding general approaches to using natural language processing techniques for identifying PII are described in commonly-owned U.S. application Ser. No. 17/334,420 titled "MAPPING OF PERSONALLY-IDENTIFIABLE INFORMATION TO A PERSON BASED ON NATURAL LANGUAGE COREFERENCE RESOLUTION" filed on May 28, 2021, which is hereby incorporated by reference in its entirety.

When step 204 and step 206 have accomplished at least some of the initialization and training, the RegEx-based detector and the machine learning detector can be connected for feed forward and feedback inter-module communication. This is shown at step 210. More specifically, step 212 serves to configure the at least partially trained machine learning detector to receive inputs from the RegEx-based detector, and step 208 serves to configure the at least partially initialized RegEx-based detector to receive new RegEx rule feedback from the machine learning detector.

The thusly-formed chain of PII detectors can be integrated with a content management system (step 214). Strictly as one example integration possibility, the thusly-formed chain of PII detectors can be integrated with a content management system by instancing the chain of detectors within the boundary of said content management system, or the chain of PII detectors can be integrated with a content management system by connecting the chain of detectors to the content management system in a sidecar organization. In some cases, the chain of PII detectors is situated in an Internet domain that is separate and distinct from the Internet domain in which the content management system is situated.

On a continuing basis, the content management system provides to the chain of PII detectors, a stream of content objects, which content objects are processed through the chain of PII detectors (step 216). Over time, as more and more content objects are processed, the RegEx-based detector becomes more and more optimized for recall, accuracy, and confidence.

In some embodiments, all documents that include PII might be subjected to indexing in a manner that facilitates identification and retrieval of such PII-containing documents. In some embodiments, a particular selected document that includes PII might be indexed in a manner that facilitates fast (e.g., indexed) retrieval of specific PII or specific types of PII pertaining to a particular user. In some embodiments, a particular selected document that includes PII might be indexed in a manner that facilitates making revisions to a list of users who are permitted to share the particular selected document. In accordance with the foregoing it is possible to index all documents that contain PII for a particular individual, and as such, it is possible to perform PII-related actions on all documents that contain PII for a particular individual. Accordingly it is possible to perform PII-related actions on all documents that contain a particular type of PII (e.g., a social security number). Strictly as an example of such PII-related actions, a particular individual might request that all documents that contain his or her PII be subject to expunging or redacting of their PII. Or, strictly as another example of such PII-related actions, a particular individual might request that any document that contain his or her PII be handled as a private document rather than being handled as a shared document.

Figure 3A:
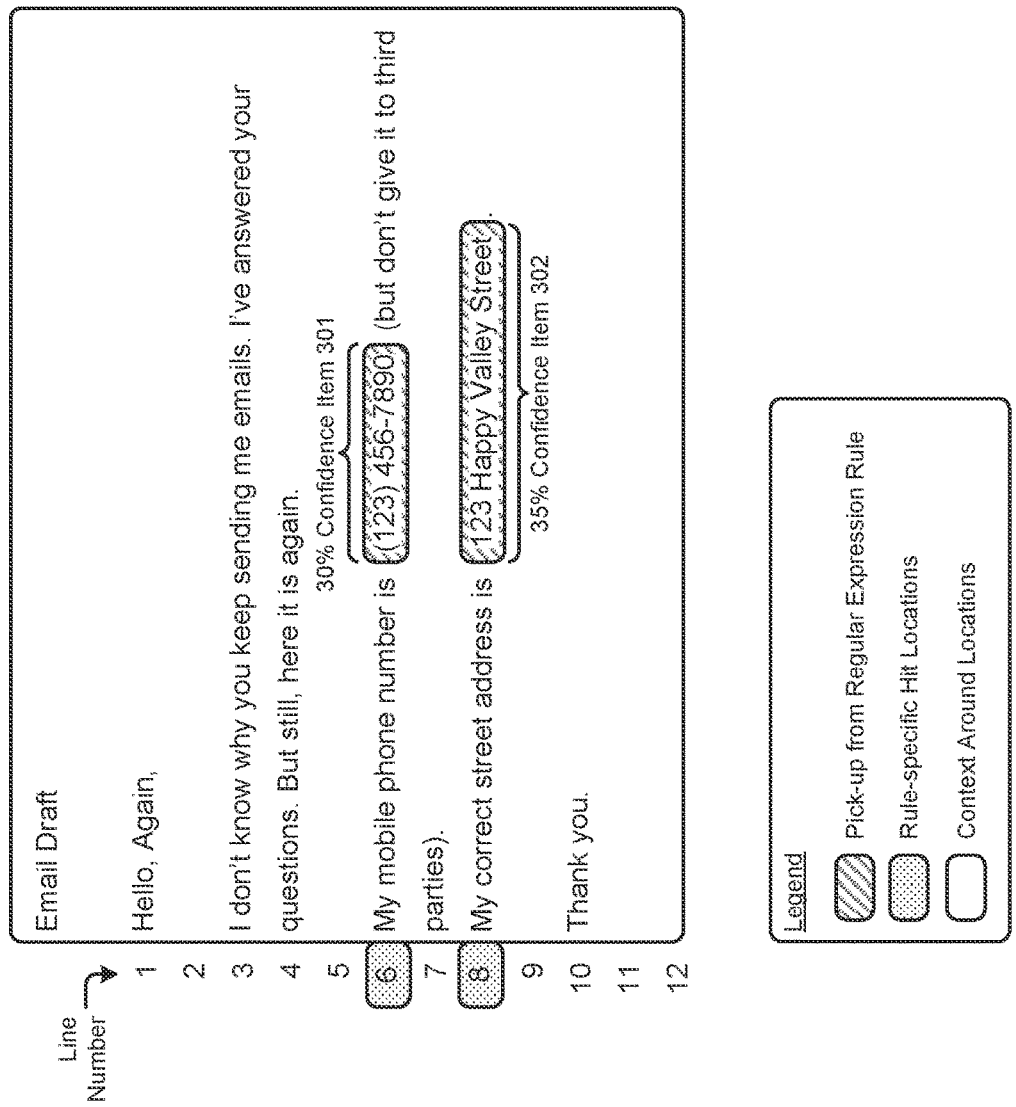
FIG. 3A, FIG. 3B, and FIG. 3C present sample document content to illustrate how different portions of document content can be processed by a chain of successively more accurate PII detectors, according to an embodiment.
Figure 3B:
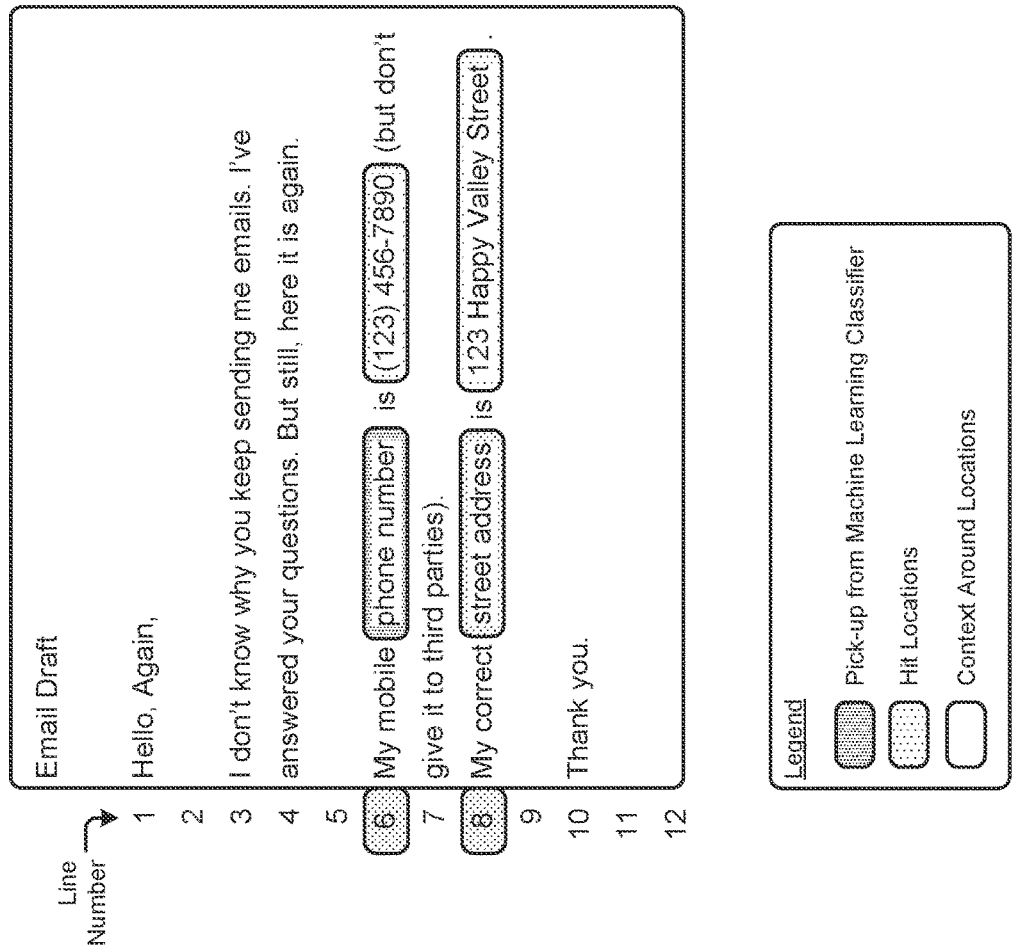
Figure 3C:
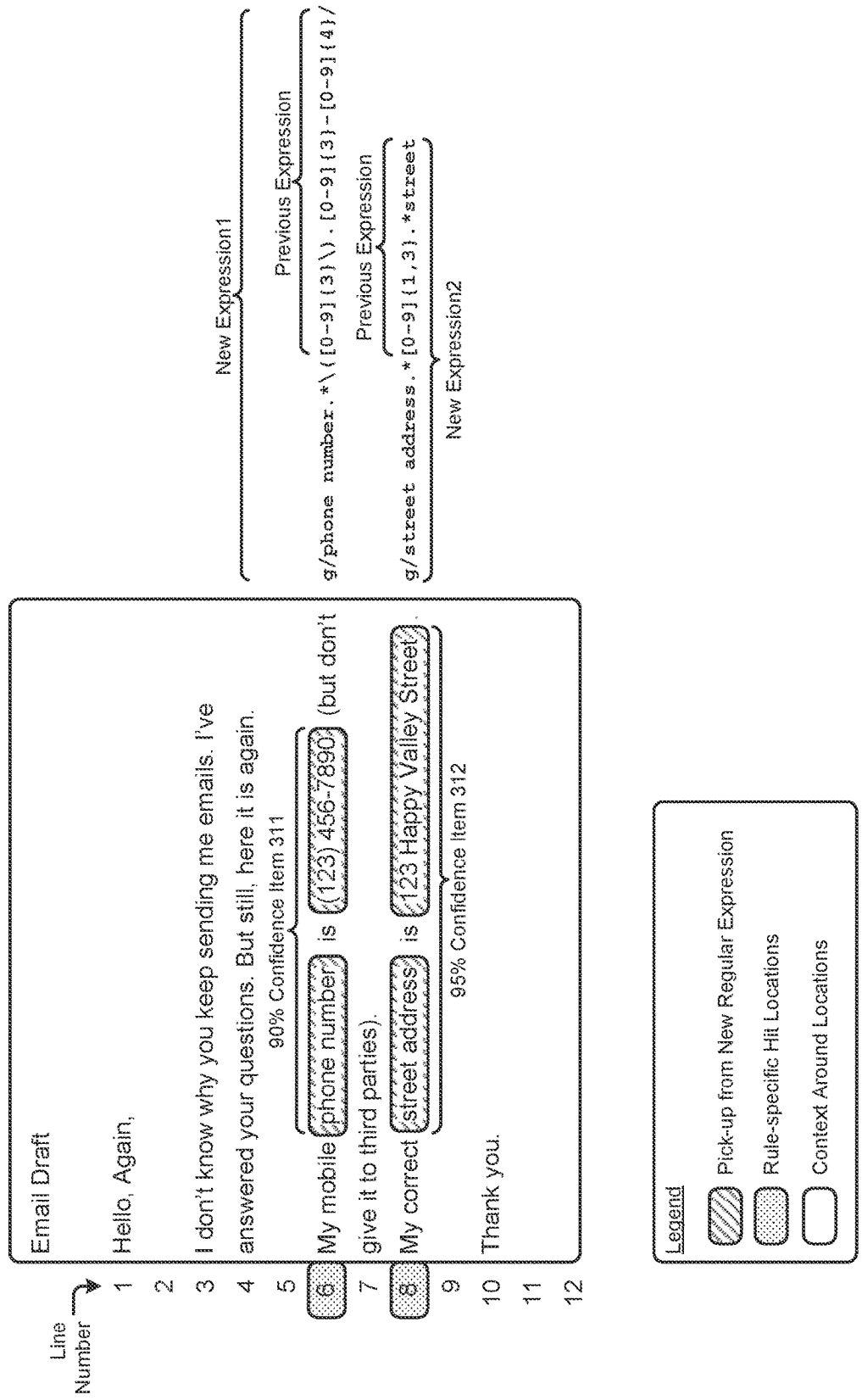

FIG. 3A, FIG. 3B, and FIG. 3C present sample document content to illustrate how different portions of document content can be processed by a chain of successively more accurate PII detectors. As an option, one or more variations of document content showing in FIG. 3A, FIG. 3B, and FIG. 3C or any aspect thereof may be implemented in the context of the architecture and functionality of the embodiments described herein and/or in any environment.

The series of figures FIG. 3A, FIG. 3B, and FIG. 3C are being presented to illustrate how a RegEx-based detector that uses regular expressions to identify patterns in content can be informed with improved regular expressions. Specifically, the successive disclosure of the figures serve to illustrate how a RegEx-based detector can be informed by a downstream machine learning detector. More specifically, FIG. 3A illustrates that a regular expression can hit on certain patterns of suspected PII, whereas FIG. 3B illustrates that a downstream machine learning classifier can isolate keywords found in the context of a hit location, which keywords are used to form an improved regular expression, and whereas FIG. 3C illustrates how a combination of regular expressions that hit on certain patterns of suspected PII can increase the confidence that the hit is indeed PII.

The depictions of FIG. 3A, FIG. 3B, and FIG. 3C show an email draft. The email draft is organized into lines having line numbers from line 1 to line 12. Line number 6 and portions of the text of that line are highlighted to illustrate that a regular expression (e.g., sample RegEx 180$_{PHONE}$) can match the pattern "(123) 456-7890". Line number 8 and portions of the text of that line are highlighted to illustrate that a regular expression (e.g., sample RegEx 180$_{ADDRESS}$) can match the pattern "123 Happy Valley Street". As shown, both matches include a numeric portion and non-numeric portions, the combination of which is believed to be indicative (e.g., by the expert who wrote sample RegEx 180$_{PHONE}$ and sample RegEx 180$_{ADDRESS}$) that the match against sample RegEx 180$_{PHONE}$ is PII in the form of a phone number and that the match against sample RegEx 180$_{ADDRESS}$ is PII in the form of an address. The foregoing matches correspond to just particular formatting of respective suspected PII values. The regular expressions and corresponding matches do not include appreciable portions of the context that might be used to validate that the suspected PII values are indeed PII, and thus, although the initial confidence is low (e.g., 30% confidence item 301 and 35% confidence item 302), it is possible that further analysis by a machine learning classifier can improve confidence.

Example results of such further analysis is shown and described as pertains to FIG. 3B. As shown, further analysis, specifically further analysis performed by a machine learning classifier can pick up machine learning model input signals from the context around the matches from application of the RegEx rules (e.g., hit locations). As shown, the pick-up from the machine learning classifier includes input words that were not matched by application of the RegEx rules. In the example of FIG. 3B, the input words are the 2-gram "phone number" and the 2-gram "street address". The input words picked up by the machine learning classifier can inform a regular expression rule generator to form an improved RegEx rule. Thereafter, application of the improved RegEx rule can yield improved confidence that suspected PII values are indeed PII. One example of this is shown and described as pertains to FIG. 3C.

Now, referring to FIG. 3C, a machine learning classifier picks up the 2-gram "phone number" from line 6. The 2-gram might be picked up because those two words are deemed by the machine learning model to be predictive of an infotype of type "10 digit phone number". More specifically, a machine learning model that is given input signals corresponding to the 5-gram "My mobile phone number is" might output the 2-gram "phone number" where each word of the 2-gram and/or the 2-gram as a whole is deemed to be predictive that an infotype of type "phone number" follows the given context. Moreover, such a machine learning model, when given the context preceding the regular expression pattern match (e.g., the context being the 5-gram "My mobile phone number is") might learn that an infotype of type "phone number" follows the context.

The matches from a RegEx-based detector (e.g., corresponding to the shown pick-up from regular expression rule of FIG. 3A) in combination with outputs of the machine learning model (e.g., corresponding to the shown pick-up from machine learning classifier of FIG. 3B) can be used as inputs to a regular expression generator. In this example, the output of the RegEx-based detector includes the hit RegEx itself as well as the 2-gram "phone number" from the machine learning model. An improved regular expression can be formed from that combination, and the improved regular expression can thereafter be used in a RegEx rule that is applied in a subsequent execution of a RegEx-based detector. In exemplary embodiments, the improved regular expression is added (e.g., as a new RegEx rule) to a repository of RegEx rules. More specifically, in many embodiments, the improved regular expression is added to the repository of RegEx rules rather than replacing any pre-existing RegEx rules. This is because it is advantageous to optimize the RegEx detector optimized for recall.

More specifically, although the initial confidence was low (e.g., referring to the 30% confidence item 301 and 35% confidence item 302 of FIG. 3B), as a result of the improved regular expressions added to the repository of RegEx rules (e.g., new expression1 and new expression2, as shown), now the confidence is high (e.g., referring to the 90% confidence item 311 and 95% confidence item 312 of FIG. 3C).

A RegEx detector that is configured for optimized recall will facilitate chained operations such that downstream detectors can have a chance to classify a candidate hit. This is distinct from deployments of RegEx detectors that are not optimized for recall, in which cases, such RegEx detectors might miss candidate hits.

Figure 4:
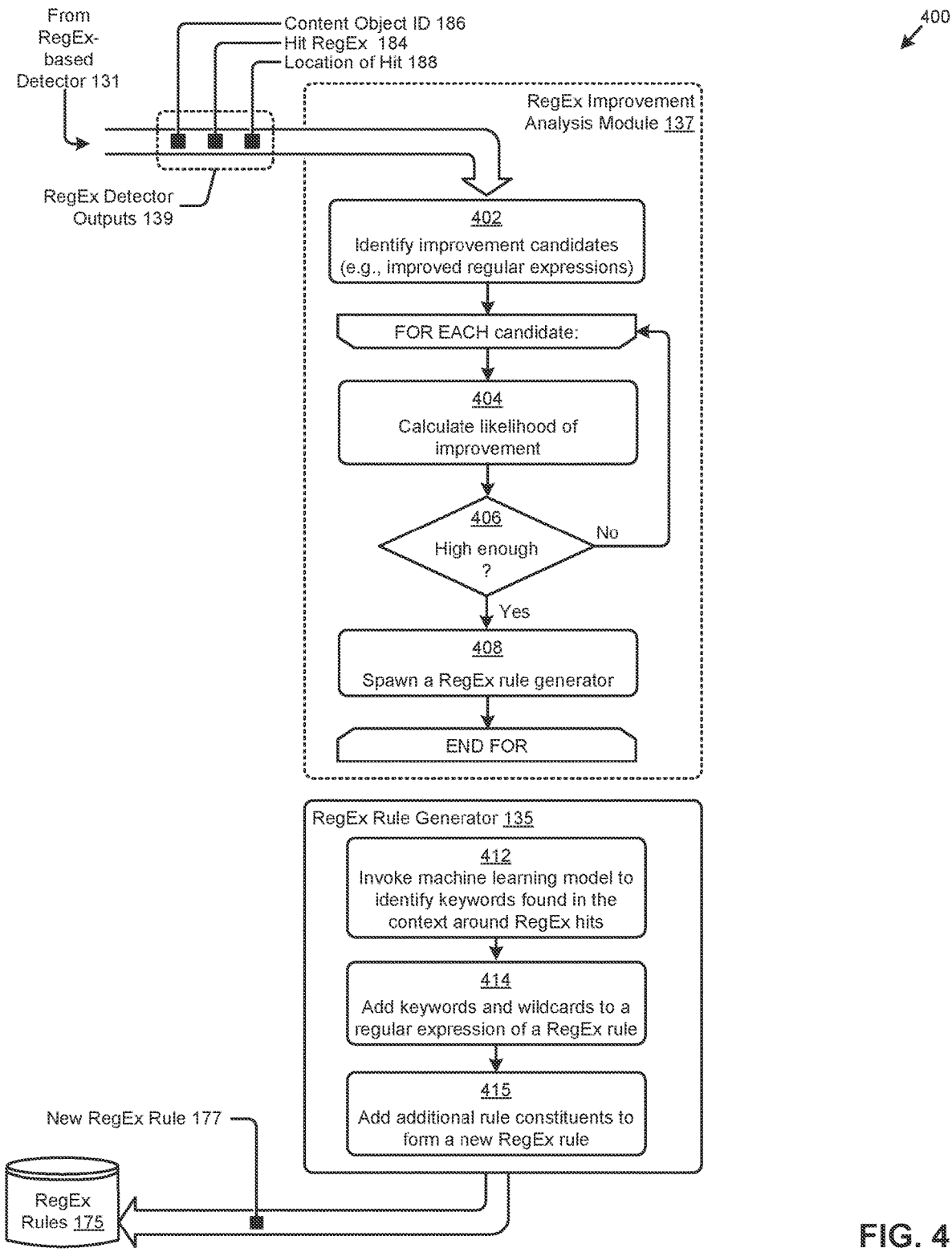
FIG. 4 shows a new RegEx generation technique as used in systems that implement new RegEx generation and feedback in a chain of successively more accurate PII detectors, according to an embodiment.

FIG. 4 shows a new RegEx generation technique as used in systems that implement new RegEx generation and feedback in a chain of successively more accurate PII detectors. As an option, one or more variations of new RegEx generation technique 400 or any aspect thereof may be implemented in the context of the architecture and functionality of the embodiments described herein and/or in any environment.

The figure is being presented to illustrate how a new RegEx rule can be generated based on outputs from a RegEx detector in combination with outputs from a machine learning model. The shown partitioning is merely for illustration and other partitionings are contemplated. This specific embodiment relies on a RegEx improvement analysis module 137 to evaluate candidate improvements. If there is a sufficient likelihood that a particular RegEx rule can be improved (e.g., via a different regular expression, and/or via an improved confidence value), then the RegEx improvement module will spawn a regular expression generator (e.g., a RegEx rule generator, a RegEx improvement module, etc.). The regular expression generator in turn will output a new RegEx rule 177.

The shown RegEx improvement analysis module 137 is particularly configured to identify improvement candidates (step 402) and then to evaluate each candidate with respect to a calculated likelihood of improvement (step 404). If it is determined that there is a sufficiently high likelihood of improvement (decision 406), then step 408 serves to spawn a RegEx rule generator. There can be as many unique RegEx rule generators as there are unique types of improvement candidates. Moreover, any number of independently-spawned RegEx rule generators can operate concurrently, and any number of independently-spawned RegEx rule generators can generate respective new RegEx rules. Some implementations specify particularly-configured RegEx rule generators, which configuration is based on the nature of an expected new rule. For example, some example implementations configure a RegEx rule generator that lengthens a RegEx rule, whereas other example implementations configure a RegEx rule generator that shortens a RegEx rule. Further, there are situations when lengthening a regular expression of a RegEx rule or where shortening a regular expression of a RegEx rule might spawn a RegEx generator helper module that decides (1) to replace a previous RegEx with the new RegEx or (2) to add a new RegEx. In some cases, when adding a new RegEx, it can happen that one or more previously generated RegEx's can be deleted or otherwise disabled. In some cases, the determination as to whether to replace a RegEx or to add a new RegEx can be made on the basis of whether or not there is a sufficiently high likelihood of improving accuracy of hits.

In some embodiments, such as is depicted in FIG. 4, a particular type of RegEx rule generator relies, at least in part, on outputs from a machine learning model. Such a machine learning model can be the same or similar to the machine learning models as heretofore shown and discussed. With respect to this particular type of RegEx rule generator, step 412 serves to identify words in the context around RegEx hits. Those identified words, possibly with preceding and/or intervening, and/or succeeding delimiters, and possibly with wildcards can be used to form a new regular expression of a RegEx rule (step 414). Additional information such as a RegEx rule label and/or a RegEx confidence value can be added to the RegEx rule (step 415) to form the shown new RegEx rule 177. The new RegEx rule is applied to the repository of RegEx rules 175.

Additional Embodiments of the Disclosure

Instruction Code Examples

Figure 5:
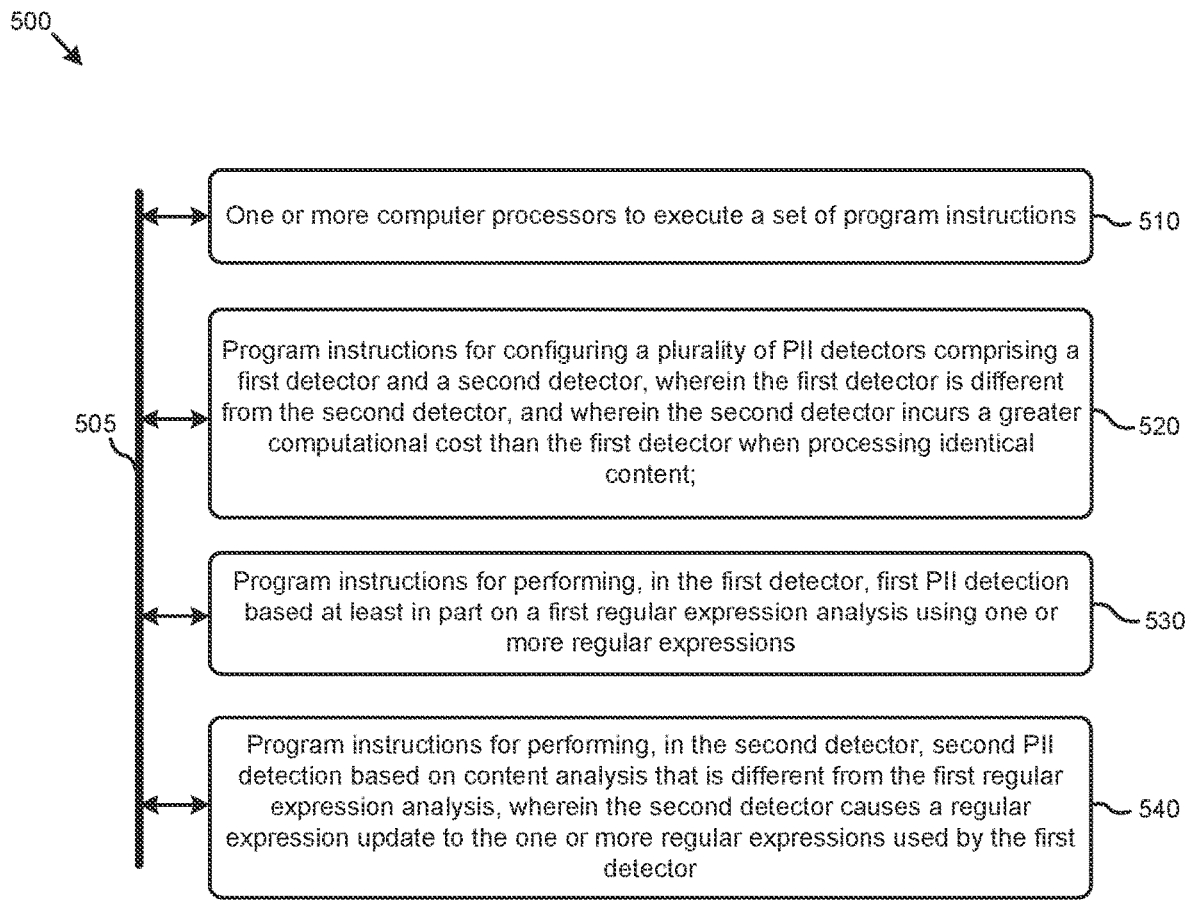
FIG. 5 depicts system components as arrangements of computing modules that are interconnected so as to implement certain of the herein-disclosed embodiments.

FIG. 5 depicts a system 500 as an arrangement of computing modules that are interconnected so as to operate cooperatively to implement certain of the herein-disclosed embodiments. This and other embodiments present particular arrangements of elements that, individually or as combined, serve to form improved technological processes that address efficiently detecting PII occurrences in a large corpus of documents. The partitioning of system 500 is merely illustrative and other partitions are possible. As an option, the system 500 may be implemented in the context of the architecture and functionality of the embodiments described herein. Of course, however, the system 500 or any operation therein may be carried out in any desired environment. The system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with any other operations over communication path 505. The modules of the system can, individually or in combination, perform method operations within system 500. Any operations performed within system 500 may be performed in any order unless as may be specified in the claims. The shown embodiment implements a portion of a computer system, presented as system 500, comprising one or more computer processors to execute a set of program code instructions (module 510) and modules for accessing memory to hold program code instructions to perform acts of: configuring a plurality of PII detectors comprising a first detector and a second detector, wherein the first detector is different from the second detector, and wherein the second detector incurs a greater computational cost than the first detector when processing identical content (module 520); performing, in the first detector, first PII detection based at least in part on a first regular expression analysis using one or more regular expressions (module 530); and performing, in the second detector, second PII detection based on content analysis that is different from the first regular expression analysis, wherein the second detector causes a regular expression update to the one or more regular expressions used by the first detector (module 540).

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

System Architecture Overview

Additional System Architecture Examples

Figure 6A:
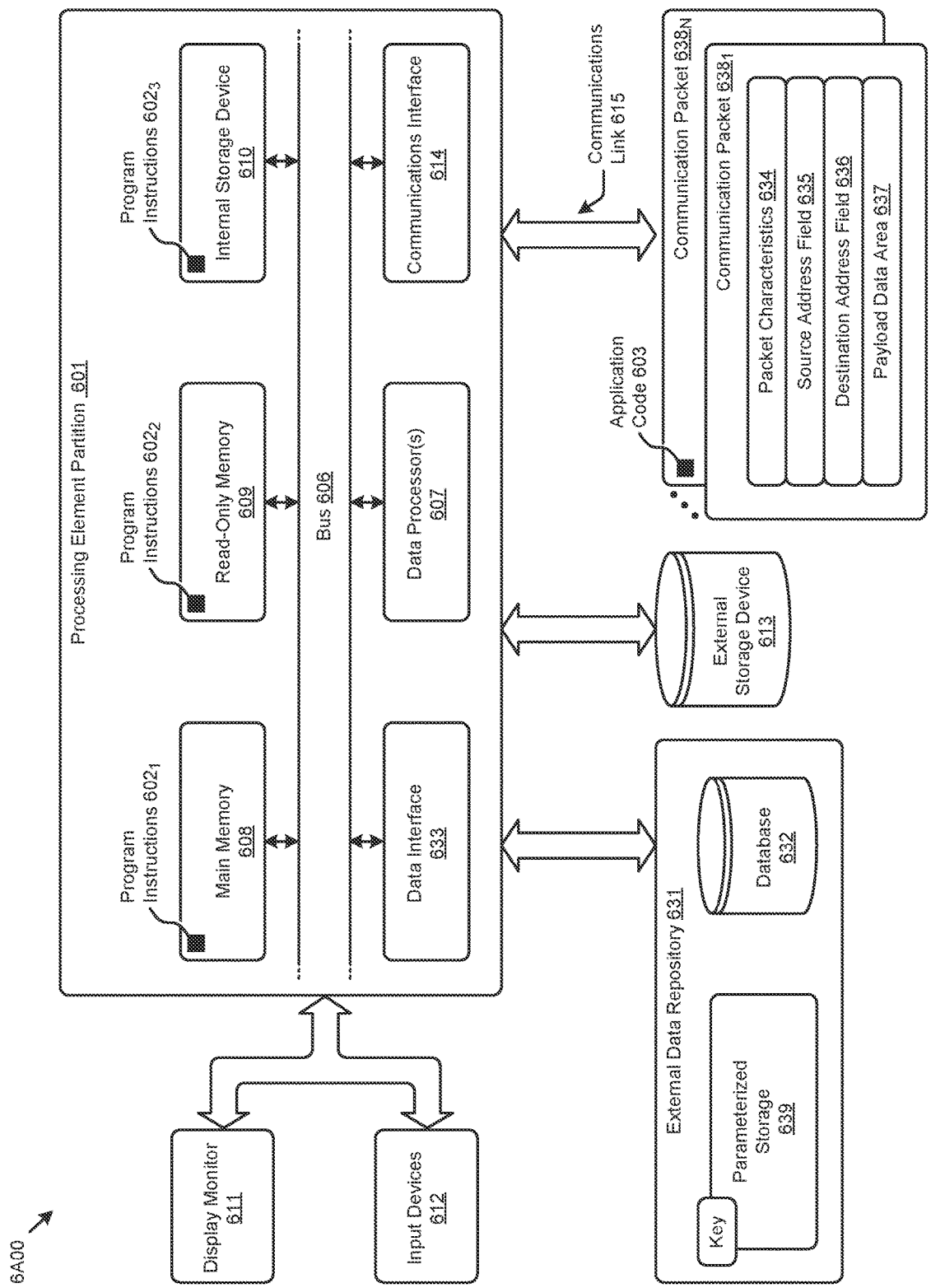
FIG. 6A and FIG. 6B present block diagrams of computer system architectures having components suitable for implementing embodiments of the present disclosure and/or for use in the herein-described environments.

FIG. 6A depicts a block diagram of an instance of a computer system 6A00 suitable for implementing embodiments of the present disclosure. Computer system 6A00 includes a bus 606 or other communication mechanism for communicating information. The bus interconnects subsystems and devices such as a central processing unit (CPU), or a multi-core CPU (e.g., data processor 607), a system memory (e.g., main memory 608, or an area of random access memory (RAM)), a non-volatile storage device or non-volatile storage area (e.g., read-only memory 609), an internal storage device 610 or external storage device 613 (e.g., magnetic or optical), a data interface 633, a communications interface 614 (e.g., PHY, MAC, Ethernet interface, modem, etc.). The aforementioned components are shown within processing element partition 601, however other partitions are possible. Computer system 6A00 further comprises a display 611 (e.g., CRT or LCD), various input devices 612 (e.g., keyboard, cursor control), and an external data repository 631.

According to an embodiment of the disclosure, computer system 6A00 performs specific operations by data processor 607 executing one or more sequences of one or more program instructions contained in a memory. Such instructions (e.g., program instructions 6021, program instructions 6022, program instructions 6023, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 6A00 performs specific networking operations using one or more instances of communications interface 614. Instances of communications interface 614 may comprise one or more networking ports that are configurable (e.g., pertaining to speed, protocol, physical layer characteristics, media access characteristics, etc.) and any particular instance of communications interface 614 or port thereto can be configured differently from any other particular instance. Portions of a communication protocol can be carried out in whole or in part by any instance of communications interface 614, and data (e.g., packets, data structures, bit fields, etc.) can be positioned in storage locations within communications interface 614, or within system memory, and such data can be accessed (e.g., using random access addressing, or using direct memory access DMA, etc.) by devices such as data processor 607.

Communications link 615 can be configured to transmit (e.g., send, receive, signal, etc.) any types of communications packets (e.g., communication packet $638_1$, communication packet $638_N$) comprising any organization of data items. The data items can comprise a payload data area 637, a destination address 636 (e.g., a destination IP address), a source address 635 (e.g., a source IP address), and can include various encodings or formatting of bit fields to populate packet characteristics 634. In some cases, the packet characteristics include a version identifier, a packet or payload length, a traffic class, a flow label, etc. In some cases, payload data area 637 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 607 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 631, which in turn can be formatted into any one or more storage areas, and which can comprise parameterized storage 639 accessible by a key (e.g., filename, table name, block address, offset address, etc.).

Execution of the sequences of instructions to practice certain embodiments of the disclosure are performed by a single instance of a computer system 6A00. According to certain embodiments of the disclosure, two or more instances of computer system 6A00 coupled by a communications link 615 (e.g., LAN, public switched telephone network, or wireless network) may perform the sequence of instructions required to practice embodiments of the disclosure using two or more instances of components of computer system 6A00.

Computer system 6A00 may transmit and receive messages such as data and/or instructions organized into a data structure (e.g., communications packets). The data structure can include program instructions (e.g., application code 603), communicated through communications link 615 and communications interface 614. Received program instructions may be executed by data processor 607 as it is received and/or stored in the shown storage device or in or upon any other non-volatile storage for later execution. Computer system 6A00 may communicate through a data interface 633 to a database 632 on an external data repository 631. Data items in a database can be accessed using a primary key (e.g., a relational database primary key).

Processing element partition 601 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 607. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to a PII labeling system formed using a chain of successively more accurate PII detectors. A module may include one or more state machines and/or combinational logic used to implement or facilitate the operational and/or performance characteristics pertaining to a PII labeling system formed using a chain of successively more accurate PII detectors.

Various implementations of database 632 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of a PII labeling system formed using a chain of successively more accurate PII detectors). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to a PII labeling system formed using a chain of successively more accurate PII detectors, and/or for improving the way data is manipulated when performing computerized operations pertaining to implementing a chain of detectors where results of downstream stages inform upstream stages.

Figure 6B:
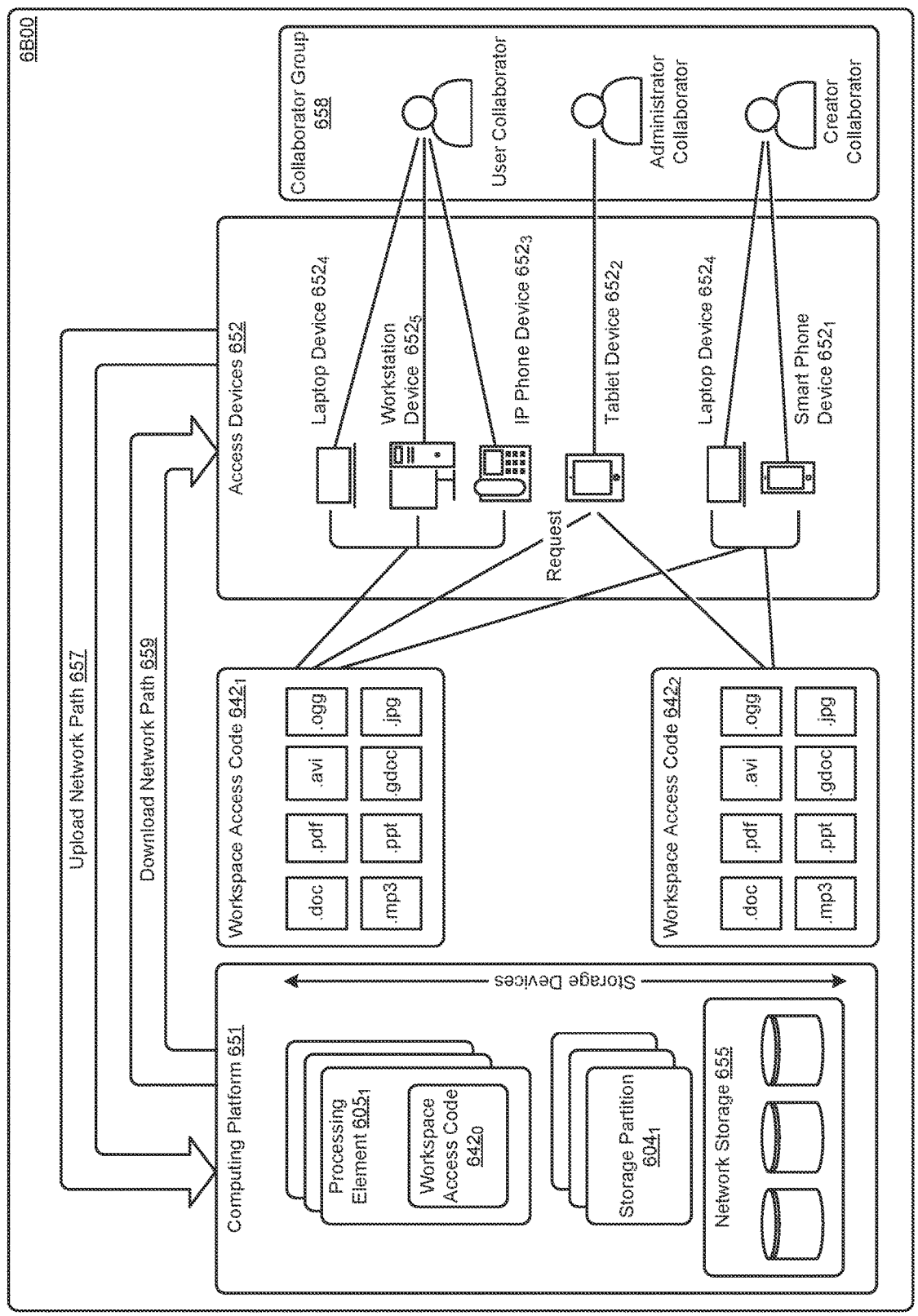

FIG. 6B depicts a block diagram of an instance of a cloud-based environment 6B00. Such a cloud-based environment supports access to workspaces through the execution of workspace access code (e.g., workspace access code $642_0$, workspace access code $642_1$, and workspace access code $642_2$). Workspace access code can be executed on any of access devices 652 (e.g., laptop device $652_4$, workstation device $652_5$, IP phone device $652_3$, tablet device $652_2$, smart phone device $652_1$, etc.), and can be configured to access any type of object. Strictly as examples, such objects can be folders or directories or can be files of any filetype. The files or folders or directories can be organized into any hierarchy. Any type of object can comprise or be associated with access permissions. The access permissions in turn may correspond to different actions to be taken over the object. Strictly as one example, a first permission (e.g., PREVIEW ONLY) may be associated with a first action (e.g., preview), while a second permission (e.g., READ) may be associated with a second action (e.g., download), etc. Furthermore, permissions may be associated to any particular user or any particular group of users.

A group of users can form a collaborator group 658, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 651, including in a middleware setting. As shown, a portion of the workspace access code resides in and can be executed on one or more processing elements (e.g., processing element $605_1$). The workspace access code can interface with storage devices such as networked storage 655. Storage of workspaces and/or any constituent files or objects, and/or any other code or scripts or data can be stored in any one or more storage partitions (e.g., storage partition $604_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 657). A stored workspace can be delivered to a particular user and/or shared with other particular users via a download (e.g., a download from a processing element to an access device over a download network path 659).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for detecting PII (personally identifiable information), the method comprising:
   maintaining a plurality of PII detectors comprising first and second detector types, wherein the first detector type is different from the second detector type, and the second detector type incurs a greater computational cost than the first detector type when processing identical content;
   determining whether to process a particular content object using at least the second detector type, by:
      performing regular expression analysis using the first detector type by evaluating a regular expression against the particular content object;
      determining whether the second detector type is to be used on the particular content object based on at least a result of performing the regular expression analysis using the first detector type; and
      when it is determined that the second detector type is to be used on the particular content object, incurring the greater computational cost of the second detector type by performing, using the second detector type, content analysis that is different from the regular expression analysis, wherein the regular expression is updated based on at least a portion of the particular content object identified using the second detector type, and the portion of the particular content object is related to a location in the particular content object identified by the first detector type; and
      when it is determined that the second detector type is not to be used, avoiding incurring the greater computations cost of the second detector type by avoiding invocation of the second detector type.

2. The method of claim 1, wherein the second detector type causes a regular expression update to the regular expression of the first detector.

3. The method of claim 1, wherein regular expression is modified based at least in part on additional information from the content analysis of the second detector type.

4. The method of claim 3, wherein the additional information comprises at least one of, a label, or a confidence value.

5. The method of claim 1, wherein the content analysis comprises determining context information that does not include a regular expression pattern match of the first detector type.

6. The method of claim 5, wherein the identical content derives from a portion of a document that is shared among two or more users of a content management system.

7. The method of claim 6, further comprising making the document that contains a particular type of PII into a private document that is not shared with other users of the content management system.

8. The method of claim 1, wherein output from the first detector type comprises a labeled content object indicating a location of a regular expression pattern match when a confidence value corresponding to the regular expression pattern match is above a threshold.

9. The method of claim 1, further comprising a regular expression generator that outputs a new regular expression.

10. The method of claim 1, further expunging or redacting a particular type of PII from a document that contains that particular type of PII.

11. A non-transitory computer readable medium having stored thereon a sequence of instructions which, when stored in memory and executed by a processor causes a set of acts for detecting PII (personally identifiable information), the set of acts comping:
  maintaining a plurality of PII detectors comprising first and second detector types, wherein the first detector type is different from the second detector type, and the second detector type incurs a greater computational cost than the first detector type when processing identical content;
  determining whether to process a particular content object using at least the second detector type, by:
    performing regular expression analysis using the first detector type by evaluating a regular expression against the particular content object;
    determining whether the second detector type is to be used on the particular content object based on at least a result of performing the regular expression analysis using the first detector type; and
    when it is determined that the second detector type is to be used on the particular content object, incurring the greater computational cost of the second detector type by performing, using the second detector type, content analysis that is different from the regular expression analysis, wherein the regular expression is updated based on at least a portion of the particular content object identified using the second detector type, and the portion of the particular content object is related to a location in the particular content object identified by the first detector type; and
    when it is determined that the second detector type is not to be used, avoiding incurring the greater computations cost of the second detector type by avoiding invocation of the second detector type.

12. The non-transitory computer readable medium of claim 11, wherein the second detector type causes a regular expression update to the regular expression of the first detector type.

13. The non-transitory computer readable medium of claim 11, wherein at least the regular expression is modified based at least in part on additional information from the content analysis of the second detector type.

14. The non-transitory computer readable medium of claim 13, wherein the additional information comprises at least one of, a label, or a confidence value.

15. The non-transitory computer readable medium of claim 11, wherein the content analysis comprises determining context information that does not include a regular expression pattern match of the first detector type.

16. The non-transitory computer readable medium of claim 15, wherein the identical content derives from a portion of a document that is shared among two or more users of a content management system.

17. The non-transitory computer readable medium of claim 16, wherein the set of acts further comprise making the document that contains a particular type of PII into a private document that is not shared with other users of the content management system.

18. A system for detecting PII (personally identifiable information), the system comprising:
  a storage medium having stored thereon a sequence of instructions; and
  a processor that executes the sequence of instructions to cause a set of acts, the set of acts comprising,
  maintaining a plurality of PII detectors comprising first and second detector types, wherein the first detector type is different from the second detector type, and the second detector type incurs a greater computational cost than the first detector type when processing identical content;
  determining whether to process a particular content object using at least the second detector type, by:
    performing, regular expression analysis using the first detector type by evaluating a regular expression against the particular content object;
    determining whether the second detector type is to be used on the particular content object based on at least a result of performing the regular expression analysis using the first detector type; and
    when it is determined that the second detector type is to be used on the particular content object, incurring the greater computational cost of the second detector type by performing, using the second detector type, content analysis that is different from the regular expression analysis, wherein the regular expression is updated based on at least a portion of the particular content object identified using the second detector type, and the portion of the particular content object is related to a location in the particular content object identified by the first detector type; and
  when it is determined that the second detector type is not to be used, avoiding incurring the greater computations cost of the second detector type by avoiding invocation of the second detector type.

19. The system of claim 18, wherein the second detector type causes a regular expression update to the regular expression of the first detector type.

20. The system of claim 18, wherein regular expression is modified based at least in part on additional information from the content analysis of the second detector type.

21. The system of claim 20, wherein the additional information comprises at least one of, a label, or a confidence value.

22. The system of claim 18, wherein the content analysis comprises determining context information that does not include a regular expression pattern match of the first detector type.

23. The system of claim 22, wherein the identical content derives from a portion of a document that is shared among two or more users of a content management system.

* * * * *